United States Patent
Omori et al.

(10) Patent No.: US 7,716,477 B2
(45) Date of Patent: May 11, 2010

(54) DATA PROCESSING METHOD, PROGRAM OF THE SAME, AND DEVICE OF THE SAME

(75) Inventors: Kazuo Omori, Tokyo (JP); Akira Honjo, Tokyo (JP); Masahiro Sueyoshi, Kanagawa (JP); Naofumi Hanaki, Kanagawa (JP); Kei Tateno, Tokyo (JP)

(73) Assignee: Sony Corporation (JP)

( * ) Notice: Subject to any disclaimer, the term of this patent is extended or adjusted under 35 U.S.C. 154(b) by 800 days.

(21) Appl. No.: 10/527,651

(22) PCT Filed: Sep. 17, 2003

(86) PCT No.: PCT/JP03/11804

§ 371 (c)(1),
(2), (4) Date: Jan. 30, 2006

(87) PCT Pub. No.: WO2004/028072

PCT Pub. Date: Apr. 1, 2004

(65) Prior Publication Data

US 2006/0155992 A1 Jul. 13, 2006

(30) Foreign Application Priority Data

Sep. 19, 2002 (JP) .............................. 2002-273444

(51) Int. Cl.
*H04L 9/32* (2006.01)
*G06F 7/04* (2006.01)
*H04L 9/00* (2006.01)

(52) U.S. Cl. ...................... 713/169; 713/168; 713/171; 713/189; 726/9; 726/20; 726/26; 380/44; 380/259; 380/278

(58) Field of Classification Search ................. 713/189, 713/168, 169, 171; 726/26, 9, 20; 380/44, 380/259, 278
See application file for complete search history.

(56) References Cited

U.S. PATENT DOCUMENTS 5,371,794 A 12/1994 Diffie et al.

(Continued)

FOREIGN PATENT DOCUMENTS

EP 0 867 843 A2 9/1998

(Continued)

OTHER PUBLICATIONS

Menezes et al: "Handbook of Applied Cryptography" Handbook of Applied Cryptography, CRC Press Series on Discrete Mathematics and Its Applications, Boca Raton, FL, CRC Press, US, 1997, XP002173212 ISBN: 08493-8523-7.

(Continued)

*Primary Examiner*—William R Korzuch
*Assistant Examiner*—Sarah Su
(74) *Attorney, Agent, or Firm*—Lerner, David, Littenberg, Krumholz & Mentlik, LLP

(57) ABSTRACT

Mutual authentication is performed by using first and second authentication key data between a first data processing device and a second data processing device. When the mutual authentication is succeeded, the first data processing device uses encryption key data for encrypting predetermined data and outputs the data to the second data processing device. The second data processing device decrypts the encrypted data by using decryption key data and judges whether the data is adequate or not for making the data to effective.

30 Claims, 26 Drawing Sheets

U.S. PATENT DOCUMENTS

| | | | |
|---|---|---|---|
| 5,850,445 A * | 12/1998 | Chan et al. | 380/247 |
| 6,018,581 A * | 1/2000 | Shona et al. | 380/46 |
| 6,813,709 B1 * | 11/2004 | Benardeau | 713/172 |
| 7,046,810 B2 * | 5/2006 | Takada et al. | 380/284 |
| 7,080,259 B1 * | 7/2006 | Nakanishi et al. | 713/193 |
| RE39,622 E * | 5/2007 | Kusakabe et al. | 713/169 |
| 7,237,112 B1 * | 6/2007 | Ishiguro et al. | 713/169 |
| 2001/0034715 A1 * | 10/2001 | Shibata et al. | 705/57 |
| 2001/0041593 A1 * | 11/2001 | Asada | 455/558 |
| 2003/0200433 A1 * | 10/2003 | Stirbu | 713/169 |
| 2004/0034752 A1 * | 2/2004 | Ohran | 711/161 |
| 2004/0049454 A1 * | 3/2004 | Kanno et al. | 705/39 |
| 2005/0246553 A1 * | 11/2005 | Nakamura et al. | 713/193 |
| 2006/0101265 A1 * | 5/2006 | Omori et al. | 713/168 |
| 2007/0014399 A1 * | 1/2007 | Scheidt et al. | 380/44 |
| 2007/0201702 A1 * | 8/2007 | Hendricks et al. | 380/282 |
| 2007/0226498 A1 * | 9/2007 | Walmsley et al. | 713/168 |
| 2007/0241182 A1 * | 10/2007 | Buer | 235/380 |
| 2008/0056498 A1 * | 3/2008 | Verma | 380/278 |
| 2009/0287935 A1 * | 11/2009 | Aull et al. | 713/182 |

FOREIGN PATENT DOCUMENTS

| | | |
|---|---|---|
| EP | 1 037 131 A2 | 9/2000 |
| EP | 1 054 314 A2 | 11/2000 |
| EP | 1 176 757 A2 | 1/2002 |
| JP | 07-087078 A | 3/1995 |
| JP | 08-242224 A | 9/1996 |
| JP | 9-115019 A | 5/1997 |
| JP | 10-327142 A | 12/1998 |
| JP | 2000-332742 A | 11/2000 |
| JP | 2000-332748 A | 11/2000 |
| JP | 2001-127757 A | 5/2001 |
| JP | 2001-298449 A | 10/2001 |
| JP | 2002-111658 A | 4/2002 |
| JP | 2002-244756 A | 8/2002 |
| JP | 2002-245414 A | 8/2002 |
| JP | 2002-258969 A | 9/2002 |
| WO | 02/11363 | 2/2002 |

OTHER PUBLICATIONS

European Search Report, EP 03 74 8534.

\* cited by examiner

3a IC MODULE

50 MEMORY

FIG. 15

| APE TYPE NUMBER | APE TYPE |
|---|---|
| ... | IC SYSTEM KEY |
| ... | IC AREA KEY |
| ... | IC SERVICE KEY |
| ... | IC SYNTHETIC KEY |
| ... | IC KEY CHANGE PACKAGE |
| ... | IC ISSUANCE KEY PACKAGE |
| ... | IC EXPANSION ISSUANCE KEY PACKAGE |
| ... | IC AREA REGISTRATION KEY PACKAGE |
| ... | IC AREA DELETION KEY PACKAGE |
| ... | IC SERVICE REGISTRATION KEY PACKAGE |
| ... | IC SERVICE DELETION KEY PACKAGE |
| ... | IC MEMORY DIVISION KEY PACKAGE |
| ... | IC MEMORY DIVISION ELEMENT KEY PACKAGE |
| ... | OBSTACLE RECORDING FILE |
| ... | MUTUAL AUTHENTICATION USE KEY |
| ... | PACKAGE KEY |
| ... | NEGATIVE LIST |
| ... | SERVICE DATA TEMPORARY FILE |

FIG. 17

| MUTUAL AUTHENTICATION KEY NAME | AP MEMORY AREA-ID | APE TYPE NUMBER | INSTANCE NUMBER | ELEMENT VERSION |
|---|---|---|---|---|
| DEVICE KEY | ... | ... | ... | ... |
| TERMINATION KEY | ... | ... | ... | ... |
| MANUFACTURER SETTING SERVICE MUTUAL AUTHENTICATION KEY | ... | ... | ... | ... |
| HARDWARE MANAGEMENT SERVICE MUTUAL AUTHENTICATION KEY | ... | ... | ... | ... |
| COMMUNICATION MANAGEMENT SERVICE MUTUAL AUTHENTICATION KEY | ... | ... | ... | ... |
| MUTUAL AUTHENTICATION SERVICE MUTUAL AUTHENTICATION KEY | ... | ... | ... | ... |
| AP MEMORY AREA MANAGEMENT SERVICE MUTUAL AUTHENTICATION KEY | | ... | ... | ... |
| SERVICE AP MEMORY AREA MUTUAL AUTHENTICATION KEY | | ... | ... | ... |
| SYSTEM AP MEMORY AREA MUTUAL AUTHENTICATION KEY | | ... | ... | ... |
| MANUFACTURER AP MEMORY AREA MUTUAL AUTHENTICATION KEY | | ... | ... | ... |

FIG. 18

| AP MEMORY AREA ID | ELEMENT TYPE NUMBER | ELEMENT INSTANCE NUMBER | ELEMENT VERSION NUMBER |
|---|---|---|---|
| 2 BYTES | 2 BYTES | 2 BYTES | 2 BYTES |
| AP RESOURCE AREA TO WHICH IT BELONGS | MUTUAL AUTHENTICATION KEY (FIXED VALUE) | ID OF RELEASE KEY RING | VERSION NUMBER OF USED KEY |

FIG. 19A

| MUTUAL AUTHENTICATION KEY NAME | AP MEMORY AREA-ID | APE TYPE NUMBER | INSTANCE NUMBER | ELEMENT VERSION |
|---|---|---|---|---|
| DEVICE KEY | ... | ... | ... | ... |
| HARDWARE MANAGEMENT SERVICE MUTUAL AUTHENTICATION KEY | ... | ... | ... | ... |
| COMMUNICATION MANAGEMENT SERVICE MUTUAL AUTHENTICATION KEY | ... | ... | ... | ... |
| AP MEMORY AREA MANAGEMENT SERVICE MUTUAL AUTHENTICATION KEY | ... | ... | ... | ... |
| SERVICE AP MEMORY AREA AP-R MUTUAL AUTHENTICATION KEY | ... | ... | ... | ... |
| TERMINATION KEY | ... | ... | ... | ... |

- COMMAND WHICH CAN BE EXECUTED

FIG. 19B

| SERVICE TYPE | COMMAND NAME |
|---|---|
| HARDWARE MANAGEMENT SERVICE | ... |
| COMMUNICATION MANAGEMENT SERVICE | ... |
| IC SERVICE | ... |
| MUTUAL AUTHENTICATION SERVICE | ... |
| AP MEMORY AREA MANAGEMENT SERVICE | |

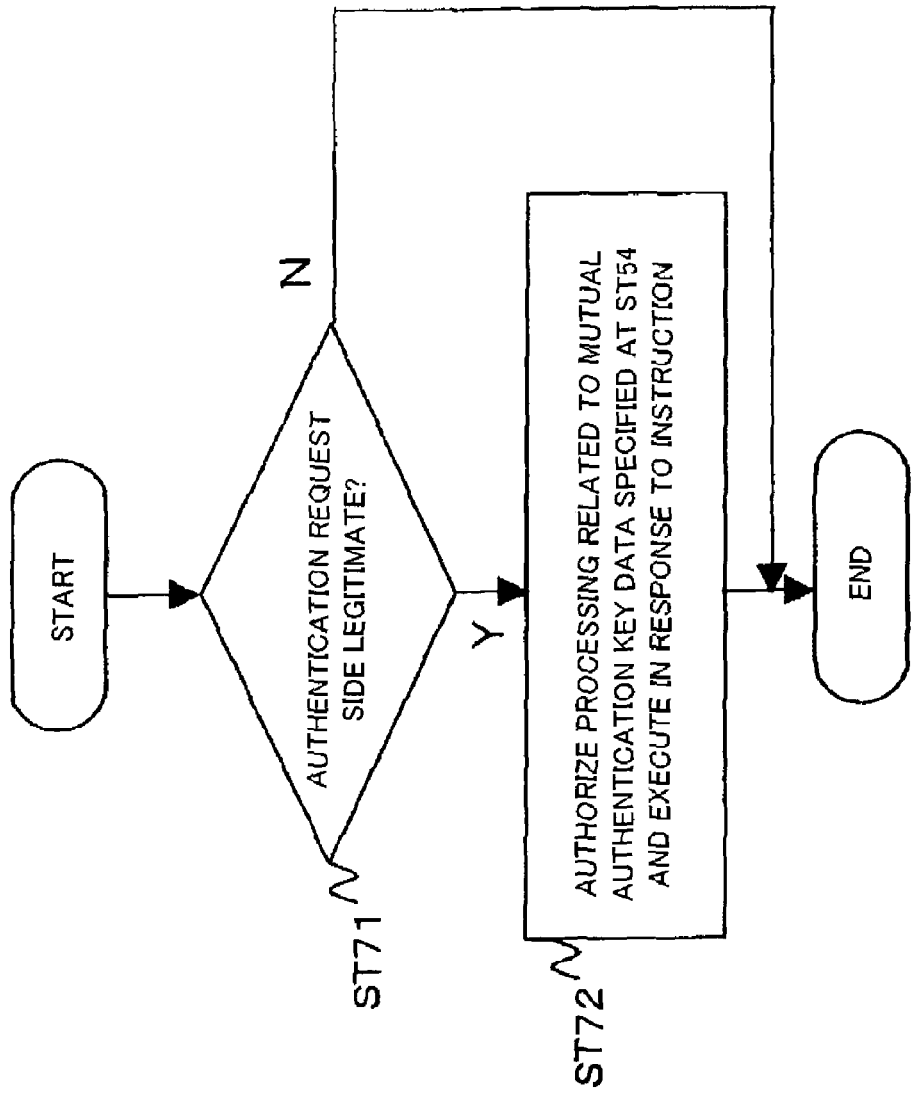

DATA PROCESSING METHOD, PROGRAM OF THE SAME, AND DEVICE OF THE SAME

TECHNICAL FIELD

The present invention relates to a data processing method for performing predetermined processing based on authentication results, a program of the same, and a device of the same.

BACKGOUND ART

There is a system performing mutual authentication between a first data processing device and a second data processing device and outputting encrypted data from the first data processing device to the second data processing device after authenticating the mutual legitimacy.

In such a system, the same key data is used for the mutual authentication and the encryption of data.

However, if the same key data is used for the mutual authentication and the encryption of data like the above mentioned system of related art, when the key data of the mutual authentication is obtained illegitimately by a third party, there is a problem that transmitted encrypted data is deciphered illegitimately by using the key data.

DISCLOSURE OF THE INVENTION

The present invention was made in consideration of such a circumstance, as set forth above. An object of the present invention is to provide a data processing method enabling to make encrypted data provided following the authentication not to be deciphered even when key data of the authentication is obtained illegitimately by a third party.

To attain the above object, a data processing method of a first invention is performed by a first processing device and a second processing device when the first data processing device holds first authentication key data and encryption key data and the second data processing device holds second authentication data corresponding to the first authentication data and decryption key data corresponding to the encryption data, and it has a first step by which the first data processing device uses the first authentication key data and the second processing device uses the second authentication key data, and authentication is performed between the first data processing device and the second data processing device; a second step by which when the second data processing device verifies the first data processing device by the authentication in the first step, the first processing device uses the encryption key data for encryption and decrypts encrypted data provided to the second data processing device by using the decryption key data; and a third step by which when the second data processing device judges that decryption data obtained by the decryption in the second step is decrypted adequately, the second data processing device uses the decryption data as the data is effective.

The mode of operation of the data processing method of the first aspect of the invention is as follows.

In a first step, a first data processing device uses first authentication key data and a second data processing device uses second authentication key data, and authentication is performed between the first data processing device and the second data processing device.

Then, in a second step, when the second data processing device verifies the first data processing device by the authentication in the first step, the first processing device uses the encryption key data for encryption and decrypts encrypted data provided to the second data processing device by using the decryption key data.

Then, in a third step, when the second data processing device judges that decryption data obtained by the decryption in the second step is decrypted adequately, the decrypted data is used as it is effective.

In the data processing method of the first invention, preferably, in the first step, the first data processing device and the second data processing device perform encryption and decryption of predetermined data based on a first encryption algorithm and a first decryption algorithm corresponding to the first encryption algorithm and perform the authentication, and in the second step, the second data processing device decrypts the encrypted data encrypted based on a second encryption algorithm based on a second decryption algorithm corresponding to the second encryption algorithm.

Further, in the data processing method of the first invention, preferably, when the first authentication key data is generated by a predetermined generation method by using predetermined key data, the first step has a fourth step by which the first data processing device provides key designation data designating key data used for generation of the first authentication key data to the second data processing device; a fifth step by which the second data processing device generates the second authentication key data by a predetermined generation method by using the key data designated by the key designation data received in the fourth step; a sixth step by which the first data processing device uses the first authentication key data and uses the second authentication key data generated by the second data processing device in the fifth step to perform the authentication; and a seventh step by which when the second data processing device judges that the first authentication data and the second authentication data are the same, the first data processing device is verified.

A data processing system of a second invention has a first data processing device holding first authentication key data and encryption key data, and a second data processing device holding second authentication key data corresponding to the first authentication key data, and decryption key data corresponding to the encryption key data, wherein the first data processing device uses the first authentication key data and the second data processing device uses the second authentication key data, and the authentication is performed between the first data processing device and the second data processing device, the second data processing device decrypts encrypted data provided to the second data processing device by the first data processing device by using the encryption key data for encryption by using the decryption data, when the second data processing device verifies the first data processing device by the authentication, and the second data processing device uses the decryption data as the data is effective, when the second data processing device judged decryption data obtained the decryption is decrypted adequately.

The mode of operation of the data processing method of the second aspect of the invention is as follows.

A first data processing device uses first authentication key data and a second data processing device uses the second authentication key data, and the authentication is performed between the first data processing device and the second data processing device.

Then, when the second data processing device verifies the first data processing device by the authentication, and encrypted data provided to the second data processing device by using the encryption key data for performing encryption by the first data processing device.

Then, when the second data processing device judged decryption data obtained the decryption is decrypted adequately, the decryption data is used as it is effective.

A data processing method of a third invention is a data processing method performed by a data processing device holding authentication key data and encryption key data, and it has a first step of performing authentication with an authenticated side by using the authentication key data, a second step of encrypting predetermined data by using the encryption key data after the authentication in the first step, and a third step of outputting data obtained the encryption in the second step to the authenticated side.

A data processing device of a fourth invention is encrypting predetermined data and outputting the data to an authenticated side, and it has storing means for storing authentication key data and encryption key data, authenticating means for performing authentication with an authenticated side by using the authentication key data, encryption means for encrypting predetermined data by using the encryption key data after the authentication of the authenticating means, and output means for outputting data obtained by the encryption of the encryption means to the authenticated side.

A program of a fifth invention is a program executed by a data processing device holding authentication key data and encryption key data, and it has a first step of performing authentication with an authenticated side by using the authentication key data, a second step of encrypting predetermined data by using the encryption key data after the authentication in the first step, and a third step of outputting data obtained by the encryption in the second step to the authenticated side.

A data processing method of a sixth invention is a data processing method performed by a data processing device holding authentication key data and decryption key data, and it has a first step of performing authentication with means to be authenticated by using the authentication key data, a second step of decrypting data received from the means to be authenticated by using the decryption key data, and a third step of using data obtained by the decryption in the second step as the data is effective, when verifying the means to be authenticated by the authentication in the first step.

A data processing device of a seventh invention is a data processing device holding authentication key data and decryption key data, and it has authenticating means for authenticating with means to be authenticated by using the authentication key data, input means for inputting data from the decryption key data, decryption means for decrypting the data inputted from the means to be authenticated via the input means by using the decryption key data, and control means for using data obtained by the decryption of the decryption means as the data is effective when the means to be authenticated is verified by the authentication of the authenticating means.

A program of an eighth invention is a program executed by a data processing device holding authentication key data and decryption key data, and it has a first step of performing authentication with means to be authenticated by using the authentication key data, a second step of decrypting data received from the means to be authenticated by using the decryption key data, and a third step of using data obtained by the decryption in the second step as the data is effective when the means to be authenticated is verified by the authentication in the first step.

BRIEF DESCRIPTION OF THE DRAWINGS

FIG. 15 is a view for explaining the type of application element data APE.

FIG. 17 is a view for explaining mutual authentication key data.

FIG. 18 is a view for explaining a mutual authentication code.

FIG. 19A and FIG. 19B are views for explaining the relationship between the mutual authentication key data and service.

FIG. 27 is a flow chart for explaining the processing of the SAM unit.

BEST MODE FOR WORKING THE INVENTION

Figure 1:
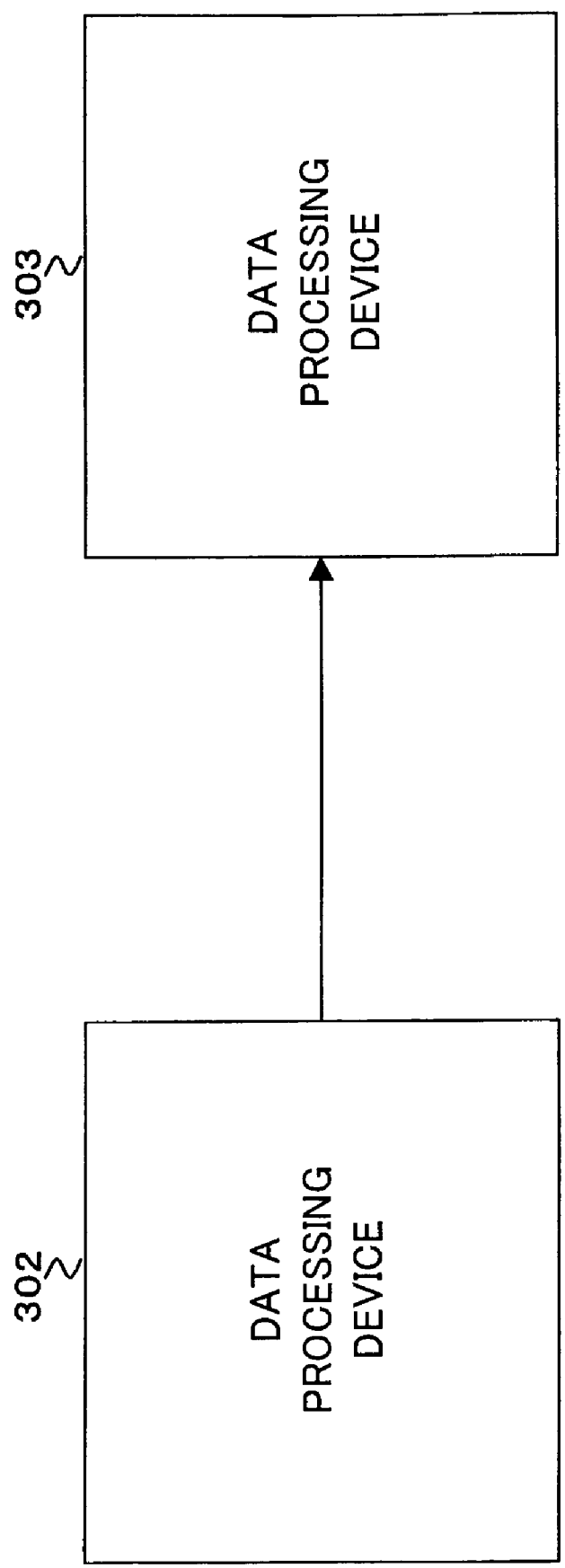
FIG. 1 is a view of a configuration of a data processing system according to a first embodiment of the present invention.

Hereinafter, an explanation will be given of preferred embodiments by referring to the drawings.

First Embodiment

FIG. 1 is a view of a configuration of a data processing system according to the present embodiment.

As shown in FIG. 1, a data processing system 301 has, for example, data processing devices 302 and 303.

Here, the data processing device 302 corresponds to a first data processing device of a first and a second invention and a data processing device of a fourth invention.

Further, the data processing device corresponds to a second data processing device of a first and a second invention and a data processing device of a seventh invention.

Figure 2:
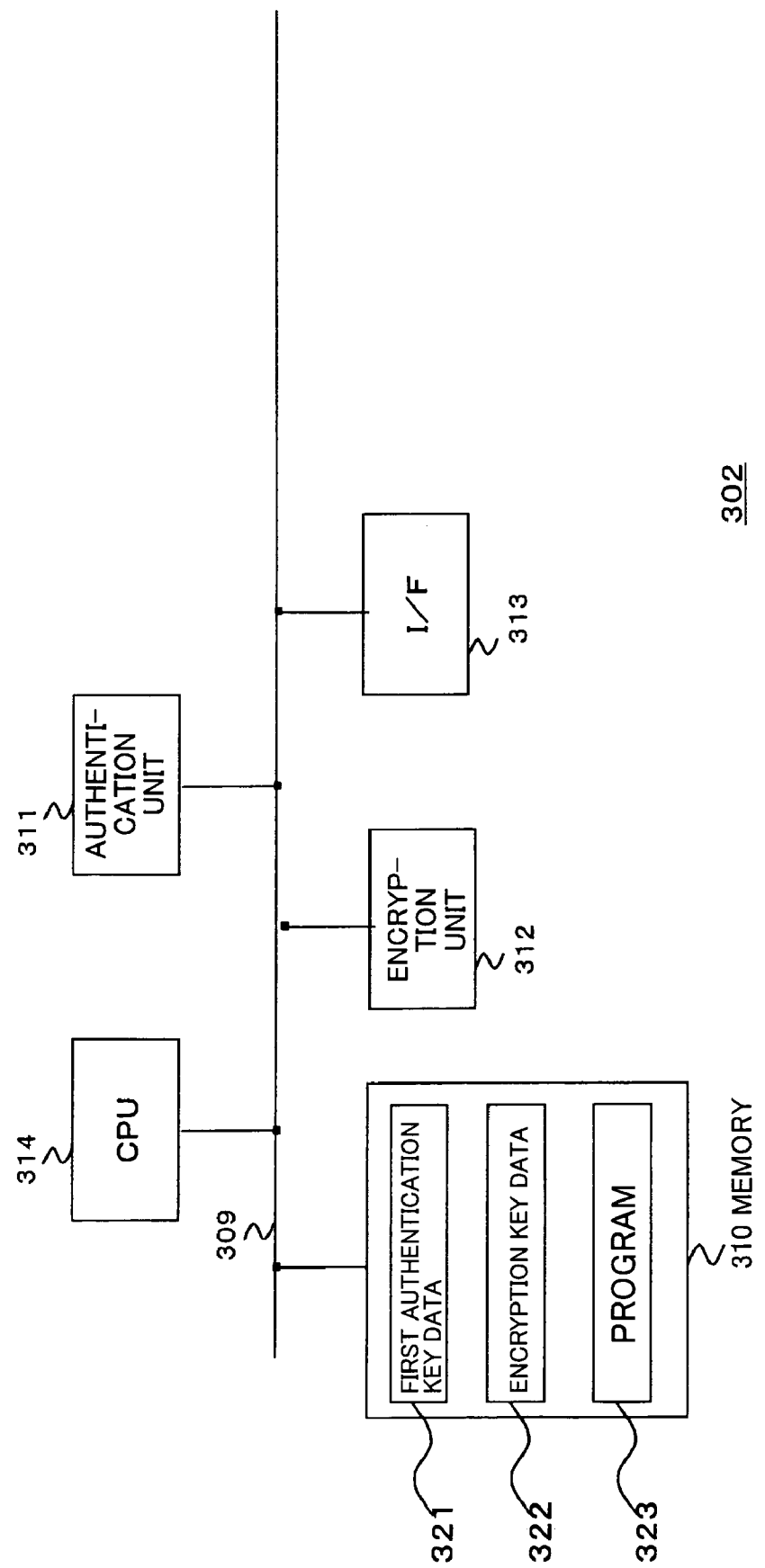
FIG. 2 is a view of a configuration of a data processing device of the output side shown in FIG. 1.

FIG. 2 is a view of a configuration of the data processing device 302.

As shown in FIG. 2, the data processing device 302 has, for example, a memory 310, an authentication unit 311, an encryption unit 312, an interface 313 and a CPU 314, and they are connected via a bus 309.

Here, the memory 310 corresponds to a memory of a fourth invention, the authentication unit 311 corresponds to authenticating means of a fourth invention, the encryption unit 312 corresponds to encryption means of a fourth invention and the interface 313 corresponds to output means of a fourth invention.

The memory 310 stores first authentication key data 321, encryption key data 322 and a program 323.

Here, the first authentication key data 321 corresponds to first authentication key data of the present invention, the encryption-key data correspond to encrypted data of the present invention and the program 323 corresponds to a program of a fifth invention.

The authentication unit 311 performs the mutual authentication with the data processing device 303 by using the first authentication key data 321.

The encryption unit 312 encrypts predetermined data by using the encryption key data 322.

The interface 313 outputs the encrypted data to the data processing device 303.

The CPU 314 executes the program 323 and controls each component of the data processing device 302 generally as mentioned later.

Figure 3:
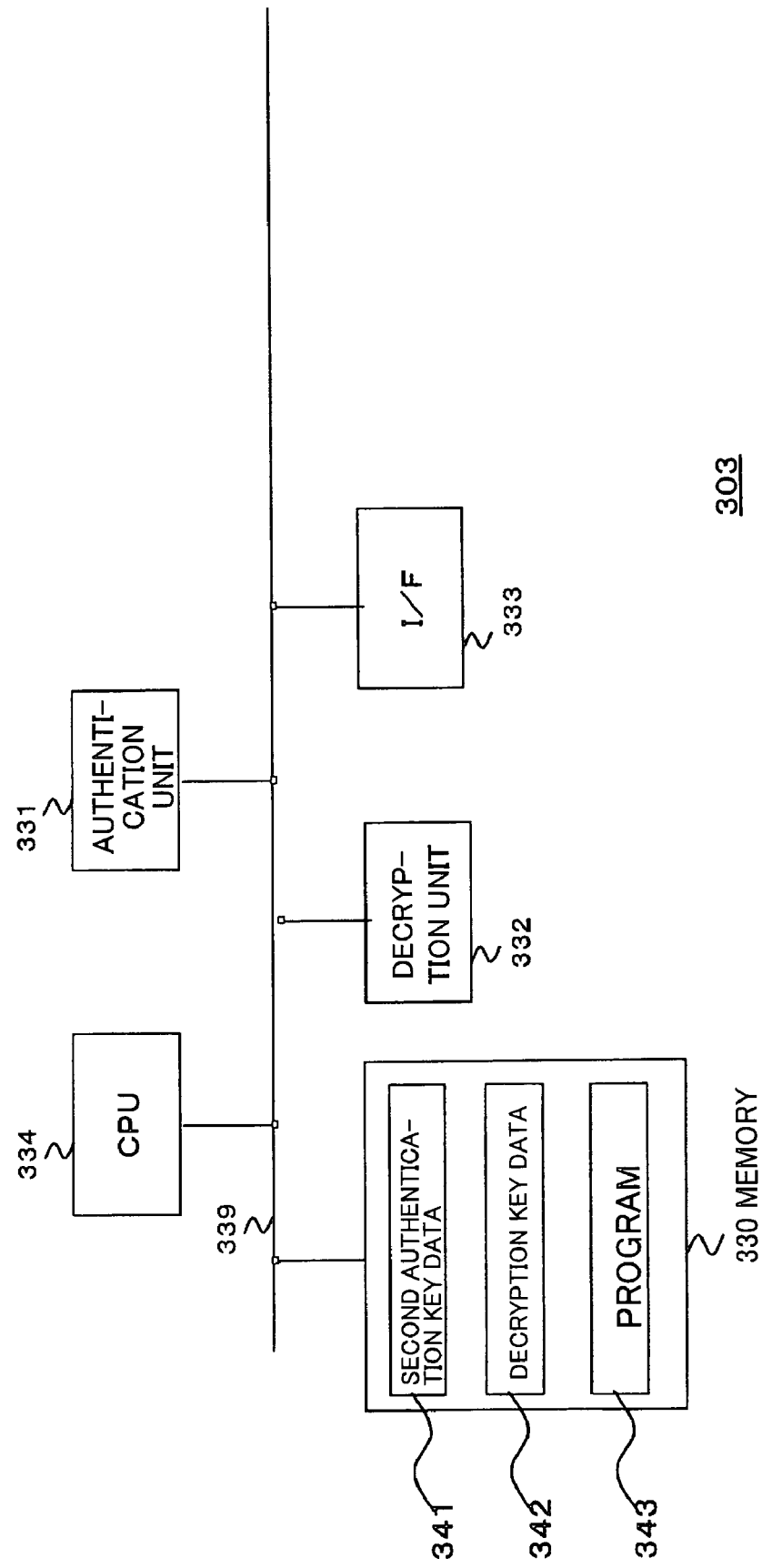
FIG. 3 is a view of a configuration of a data processing device of the input side shown in FIG. 1.

FIG. 3 is a view of a configuration of the data processing device 303.

As shown in FIG. 3, the data processing device 303 has, for example, a memory 330, an authentication unit 331, a decryption unit 332, an interface 333 and a CPU 334, and they are connected via a bus 339.

Here, the memory 330 corresponds to storing means of a seventh invention, the authentication unit 331 corresponds to authenticating means of a seventh invention, the encryption unit 332 corresponds to decryption means of a seventh invention and the interface 333 corresponds to input means of a seventh invention.

The memory 330 stores second authentication key data 341, decryption key data 342 and a program 343.

Here, the second authentication key data 341 corresponds to second authentication key data of the present invention, the decryption key data 342 corresponds to decryption data of a present invention and the program 343 corresponds to a program of a seventh invention.

The authentication unit 331 uses the second authentication key data 341 and performs mutual authentication with the data processing device 302.

The decryption unit 332 uses the decryption key data 342 and decrypts data inputted from the data processing device 302 via the interface 333.

The interface 333 inputs the decrypted data form the data processing device 302.

The CPU 334 executes the program 343 and controls each component of the data processing device 303 generally as mentioned later.

Hereinafter, operation examples of the data processing system 301 shown in FIG. 1 will be explained.

Processing shown as following is performed depending on execution of the program 323 by the CPU 314 and execution of the program 343 by the CPU 334.

Figure 4:
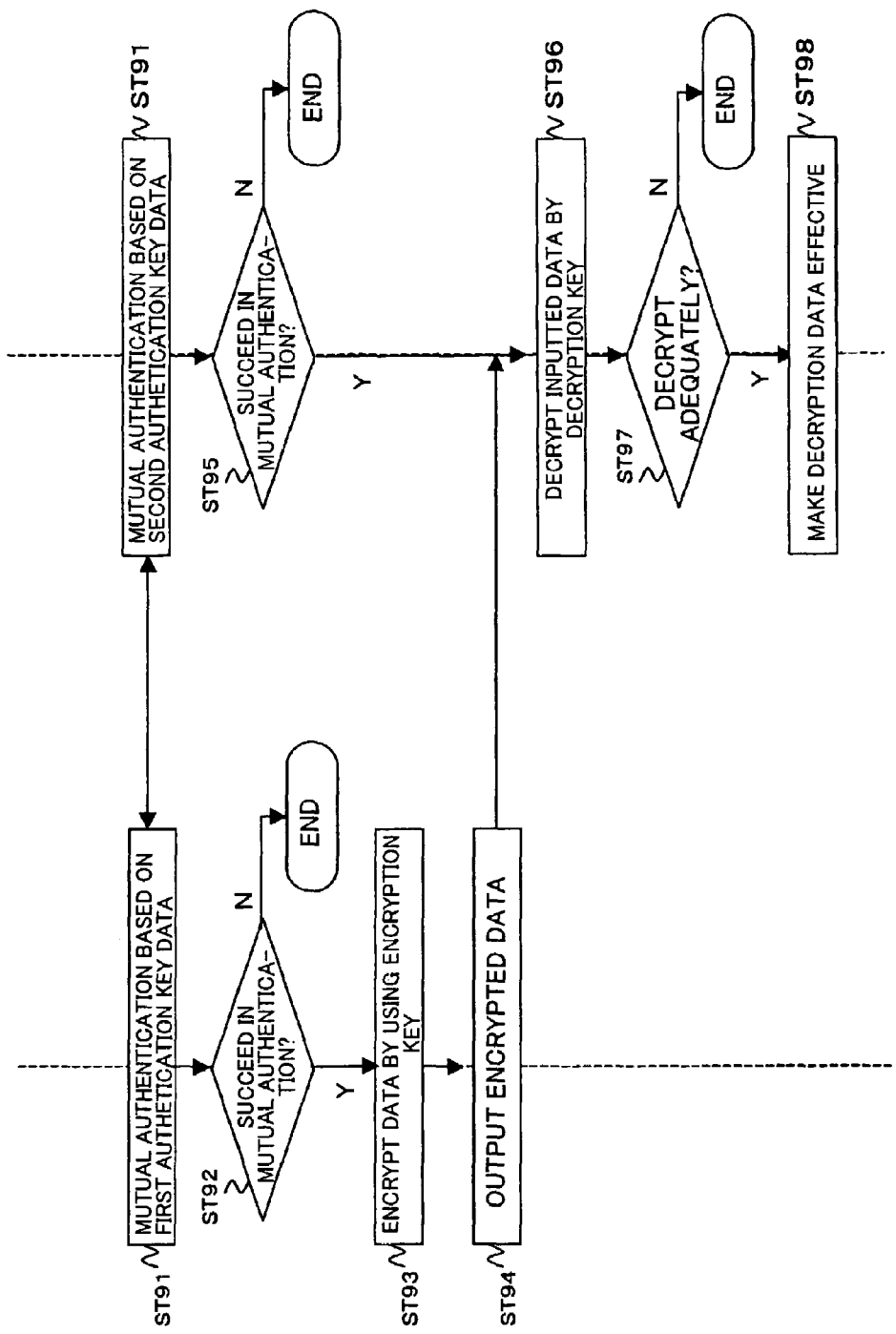
FIG. 4 is a flow chart for explaining an operation example of a data processing system shown in FIG. 1.

FIG. 4 is a flow chart for explaining the operation examples.

Step ST91:

The authentication unit 311 of the data processing device 302 uses the first authentication key data 321, the authentication unit 331 of the data processing device 303 the second authentication key data 341, and mutual authentication is performed.

At this time, the authentication units 311 and 331 use the first authentication key data 321 and 341 and perform encryption respectively and decryption of predetermined data based on a first encryption algorithm and a first decryption algorithm corresponding to the first encryption algorithm, and the authentication is performed.

For the mutual authentication, a method of mutual authentication mentioned later in a second embodiment is used.

Step ST92:

The CPU 314 of the data processing device 302 advances to processing of a step ST93 when judging it is verified respectively between the data processing device 303 by the mutual authentication in the step ST91, when it is not so, the processing is finished.

Step ST93:

The encryption unit 312 of the data processing device 302 uses the encryption key data 322 and encrypts predetermined data with a second encryption algorithm.

Step ST94:

The interface 313 of the data processing device 302 outputs data encrypted in the step ST93 to the data processing device 303.

Step ST95:

The CPU 334 of the data processing device 303 advances to processing of a step ST96 when judging it is verified respectively between the data processing device 302 by the mutual authentication in the step ST91, when it is not so, the processing is finished.

Step ST96:

The decryption unit of the data processing device 303 uses the decryption key data 342 and decrypts encrypted data inputted from the data processing device 302 via the interface 333 in the step ST 94 with a second decryption algorithm corresponding to the second encryption algorithm.

Step ST97:

The CPU 334 of the data processing device 303 judges whether decrypted data obtained by decryption in the step ST96 and advances to processing of a step ST98 when judging it is decrypted adequately, and the decryption data is decimated (defeated).

Step ST98:

The CPU 334 of the data processing device 303 uses decrypted data obtained in the step ST97 as it is effective and performs processing.

As explained above, according to the data processing system 301, due to performing mutual authentication and generation of encrypted data by using different key data, even when first and second authentication key data used by the mutual authentication is obtained illegitimately by a third party, since the encrypted data is encrypted by using encryption key data, the third party cannot decipher the encrypted data. Therefore, according to the data-processing system 301, the encrypted data can be protected adequately.

Further, according to the data processing system 301, due to using a different encryption/decryption algorithm between the mutual authentication and the generation of the encrypted data, even when the first encryption/decryption algorithm used for the mutual authentication is leaked to the third party, since the encrypted data is encrypted by a second encryption algorithm, the third party cannot decipher it.

Second Embodiment

Figure 5:
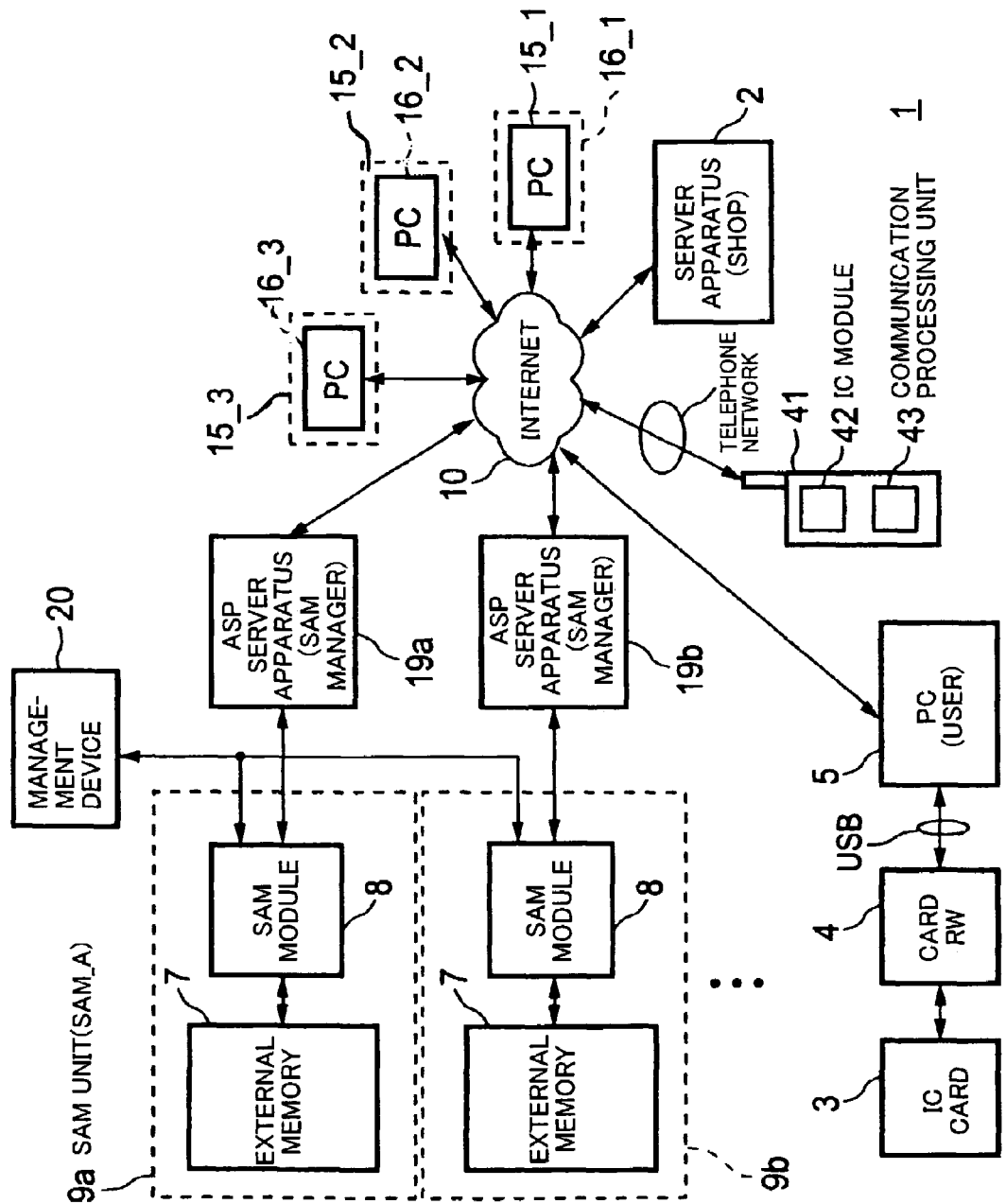
FIG. 5 is a view of the overall configuration of a communication system of a second embodiment of the present invention.

FIG. 5 is a view of the overall configuration of a communication system 1 of the present embodiment.

As shown in FIG. 5, the communication system 1 uses a server apparatus 2 disposed in a store etc., an IC card 3, a card reader/writer 4, a personal computer 5, an ASP (application service provider) server apparatus 19, SAM (secure application module) units 9a, 9b, . . . , a management device 20, and a mobile communication device 41 having a built-in IC module 42 to communicate via the Internet 10 and perform processing such as settlements using the IC card 3 or the mobile communication device 41.

In the communication system 1, the management device 20 and the SAM units 9a and 9b perform the processing relating to an embodiment corresponding to the present invention.

Namely, the management device 20 performs processing for issuing cards (for example, owner cards and user cards explained later) having built-in ICs used for making the SAM units 9a and 9b perform predetermined processing authorized by a manager etc. Due to this, it provides data required for mutual authentication to the means to be authenticated.

Further, the issued cards are used by the manager and the user and the management device 20 performs mutual authentication between the SAM units 9a and 9b based on the authentication key data.

Then, it is verified respectively by the mutual authentication, predetermined encrypted data encrypted by using encryption key data is outputted from the management device 20 to the SAM units 9a and 9b, and the SAM units decrypt the encrypted data by using decryption key data.

In this case, the management device 20 becomes a first data processing device and the means to be authenticated of the present invention, and the SAM units 9a and 9b become a second data processing device, an authenticated side the authenticating means of the present invention.

Figure 6:
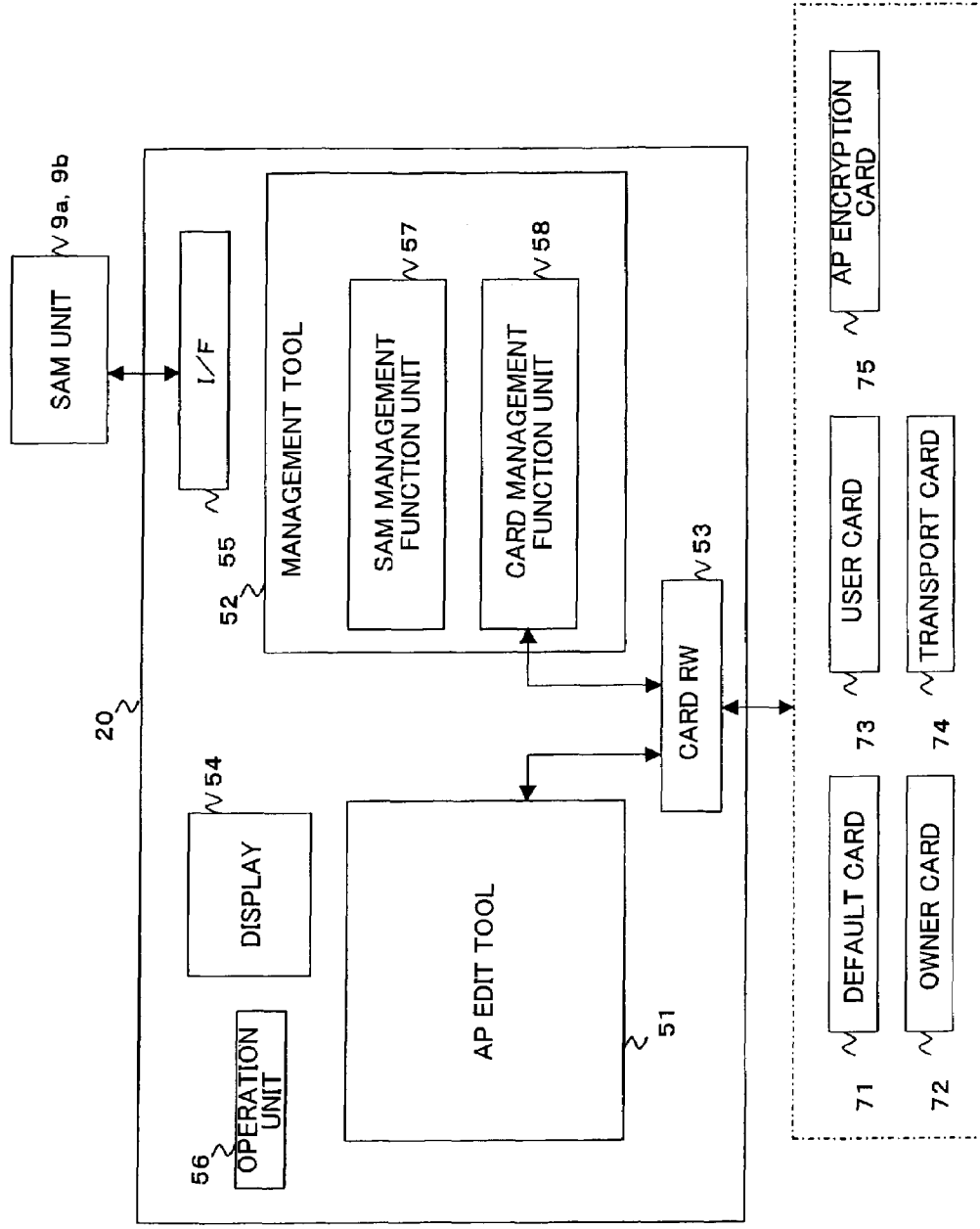
FIG. 6 is a functional block diagram of a management device shown in FIG. 5.

FIG. 6 is a functional block diagram of the management device 20.

As shown in FIG. 6, the management device 20 has for example an AP edit tool 51, a management tool 52, a card reader/writer 53, a display 54, an I/F 55, and an operation unit 56.

The AP edit tool 51 and the management tool 52 may be realized by the data processing device executing a program (corresponding to the program of the ninth aspect of the invention) and may be realized by an electronic circuit (hardware).

The management tool 52 has for example a SAM management function portion 57 and a card management function portion 58.

The card reader/writer 53 transfers data by a noncontact method or a contact method with ICs of various cards shown below.

The display 54 is used for displaying a card issuance screen and an AP management screen.

The I/F 55 transfers data with the SAM units 9a and 9b by the noncontact method or the contact method.

The operation unit 56 is used for inputting instructions or data to the AP edit tool 51 and the management tool 52.

Figure 7:
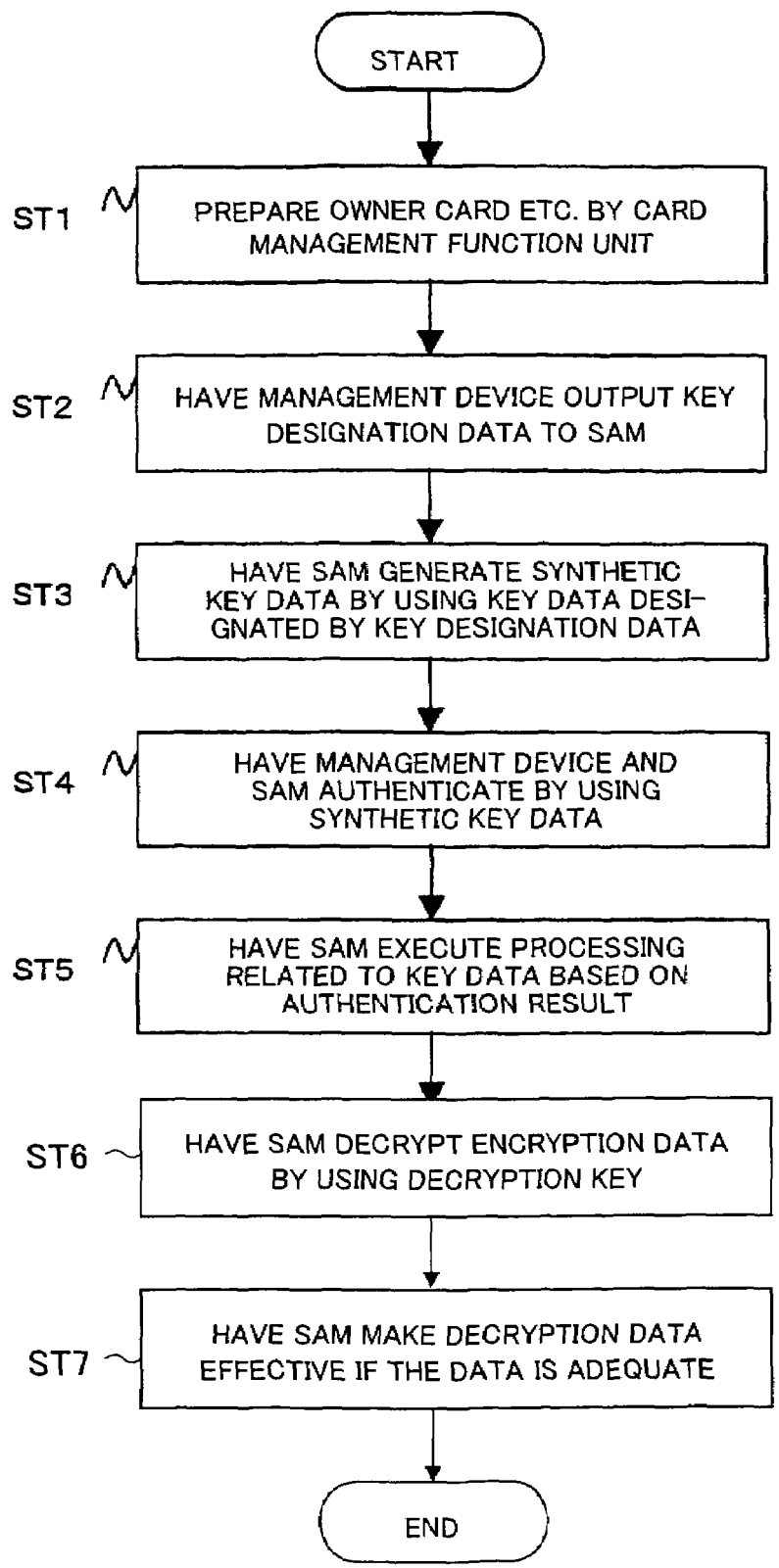
FIG. 7 is a flow chart for explaining an outline of the processing step performed by the management device shown in FIG. 6.

FIG. 7 is a flow chart for explaining an outline of the processing step performed by the management device 20.

In FIG. 7, steps ST2 to ST4 correspond to the steps ST91 to ST98 in FIG. 4, and steps ST5 to ST7 correspond to the steps ST 93 to ST98.

In this case, the management device 20 corresponds to the data processing device 302, and the SAM units 9a and 9b correspond to the data processing device 303.

Step ST1:

The management device 20 prepares an owner card 72 in which predetermined data is stored using a default card 71 set in the card reader/writer 53 by the card management function portion 58 in response to operation of the manager. Further, it prepares a user card 73 by using the owner card 72.

Namely, the management device 20 encrypts the device key data explained later by using the mutual authentication key data related to the processing authorized to the means to be authenticated using the owner card 72 and the user card 73 among processings relating to the SAM units 9a and 9b (authenticating means of the present invention) by a predetermined encryption method and generates the synthetic key data (first authentication use data of the present invention) making the mutual authentication key data hard to restore.

Then, the management device 20 writes the generated synthetic key data and the key designation data designating the mutual authentication key data used for the generation of the synthetic key data into the ICs of the owner card 72 and the user card 73.

Further, in the same way, the management device 20 prepares the transport card 74 and the AP encryption card 75.

Step ST2:

Where the user of the owner card 72 or the user card 73 makes the SAM units 9a and 9b perform the processing the authority of which was given to the user via the management device 20 by using these cards, the user makes the card reader/writer 53 of the management device 20 read and fetch the key designation data stored in the IC of the owner card 72 or the user card 73.

The SAM management function portion 57 of the management device 20 outputs the read key designation data to the SAM units 9a and 9b.

Step ST3:

The SAM units 9a and 9b use the mutual authentication key data designated by the key designation data to encrypt the device key data by a predetermined encryption method and generate synthetic key data (second authentication use data of the present invention).

Step ST4:

The SAM management function portion 57 uses the synthetic key data read out from the card 72 or the card 73 for authentication, while the SAM units 9a and 9b use the generated synthetic key data for mutual authentication based on a first encryption algorithm and a first decryption algorithm.

Step ST5:

When it is verified respectively by the mutual authentication of the step ST4, the management device 20 uses the encrypted key data, encrypts predetermined data with a second encryption algorithm and outputs to the SAM units 9a and 9b.

Step ST6:

The SAM units 9a and 9b uses the decryption key data and decrypts the encrypted data inputted in the step ST5 with second decryption data corresponding to the second encryption algorithm.

Step ST7:

The SAM units 9a and 9b judge whether the decryption data in the step ST6 is decrypted adequately or not, and when judging it is decrypted adequately, the SAM units use the decryption data as it is effective and execute processing related to the key data permitted to the owner card and so on.

While, when the SAM units 9a and 9b judged the decryption data was not decrypted adequately, the decryption data is decimated (defeated).

Figure 8:
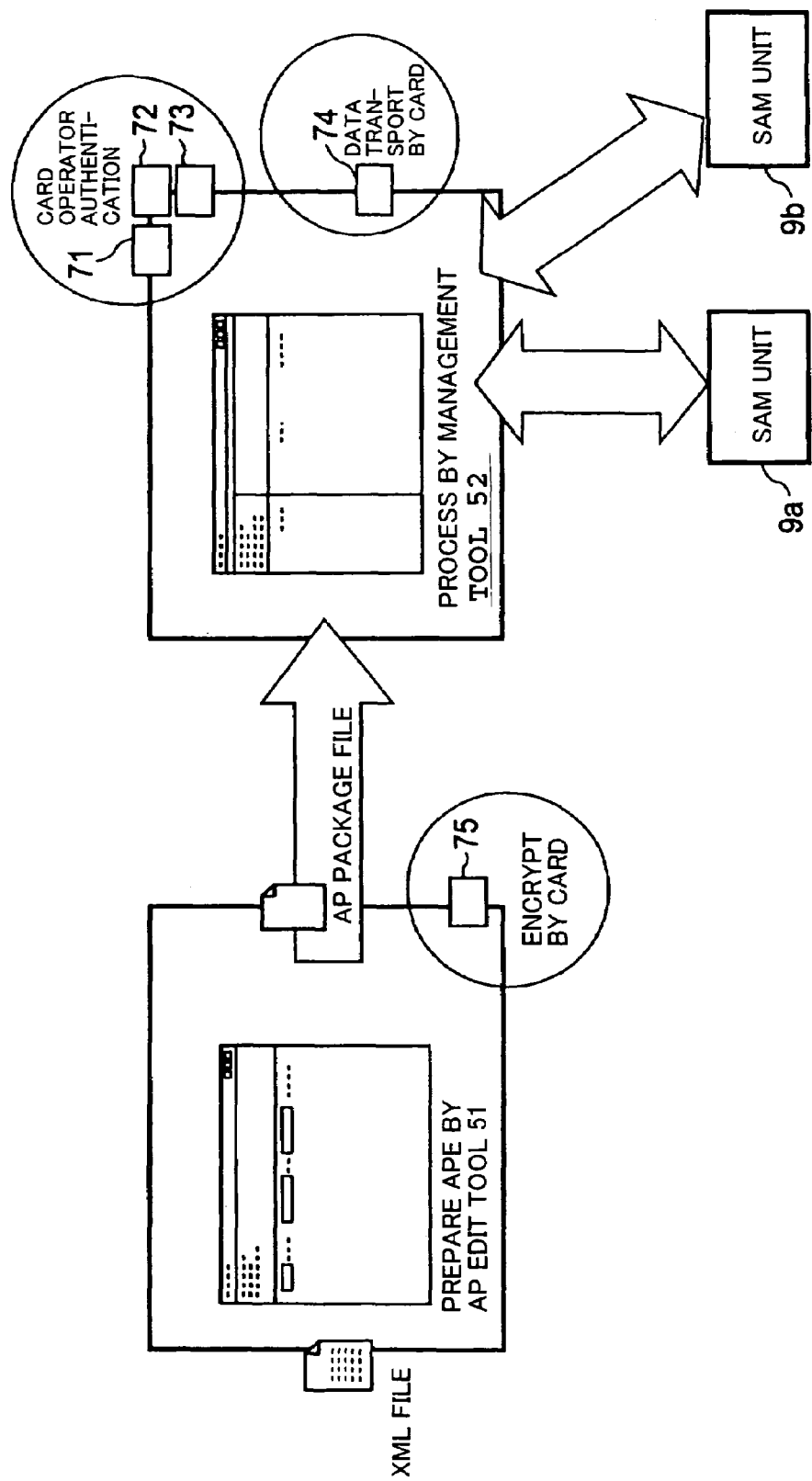
FIG. 8 is a view for explaining a card used in processing relating to an AP edit tool and management tool shown in FIG. 6.

FIG. 8 is a view for explaining cards used in the processing relating to the AP edit tool 51 and the management tool 52 shown in FIG. 6.

As shown in FIG. 8, when using the management tool 52 of the management device 20 to access the SAM units 9a and 9b, the owner card 72 and the user card 73 are used.

Further, when providing an AP package file generated by the AP edit tool 51 to the management tool 52, the AP package file is encrypted using the encryption key data stored in the IC of the AP encryption card 75.

Namely, as shown in FIG. 8, the user prepares the application element data APE configuring the application program AP in the SAM module 8 by using the AP edit tool 51.

Then, the AP edit tool 51 prepares an AP package file including one or more application element data APE, encrypts this by using the encryption key data stored in the AP encryption card 75, and provides this to the management tool 52.

The management tool 52 performs mutual authentication with the SAM units 9a and 9b as explained above and writes the AP package file received from the AP edit tool 51 to the AP memory areas in the SAM units 9a and 9b authorized relating to the mutual authentication key data used for the mutual authentication.

Further, the transport card 74 is used for extracting data relating to the security of key data etc. held by the SAM units 9a and 9b, transferring the same to another apparatus, and storing the same.

[IC Card 3 and Mobile Communication Device 41]

Figure 9:
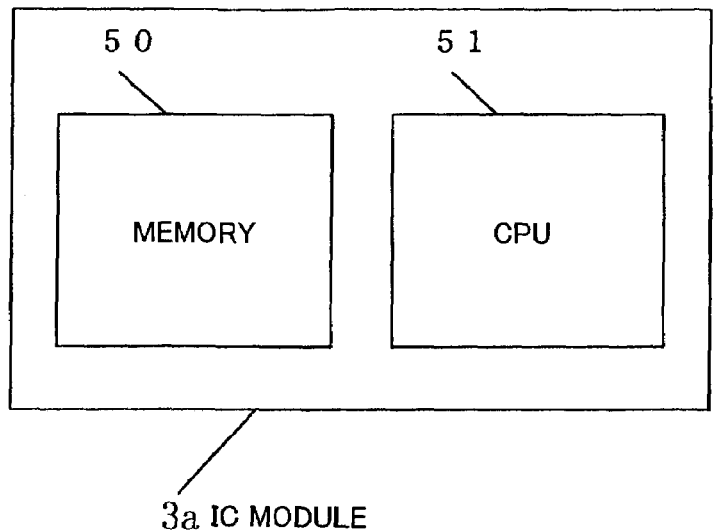
FIG. 9 is a functional block diagram of an IC card shown in FIG. 5.

FIG. 9 is a functional block diagram of the IC card 3.

As shown in FIG. 9, the IC card 3 has an IC (integrated circuit) module 3a provided with a memory 50 and a CPU 51.

Figure 10:
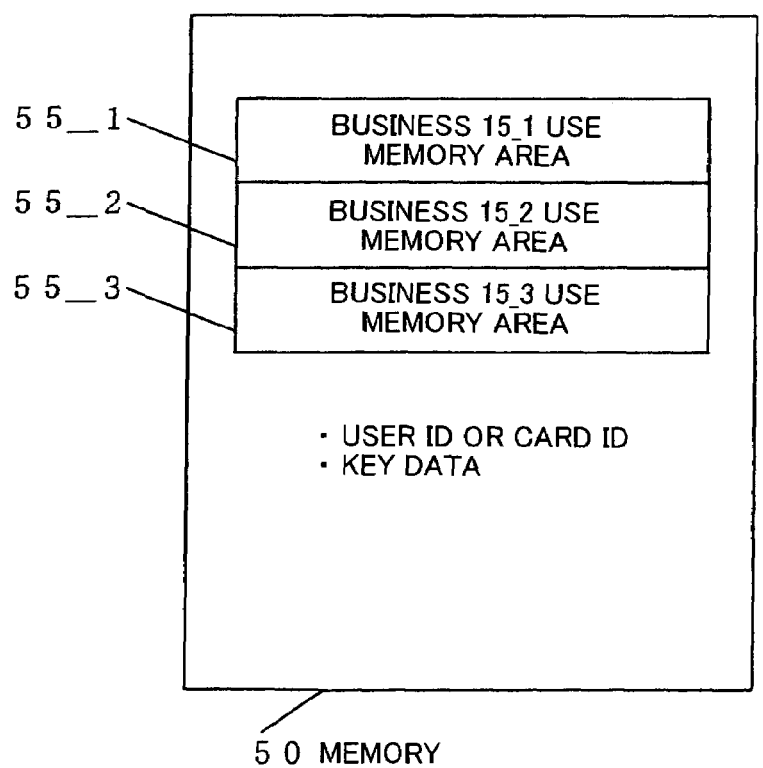
FIG. 10 is a view for explaining data stored in a memory shown in FIG. 9.

The memory 50 has, as shown in FIG. 10, a memory area 55_1 used by a service business 15_1 such as a credit card company, a memory area 55_2 used by a service business 15_2, and a memory area 55_3 used by a service business 15_3.

Further, the memory 50 stores the key data used for deciding the access right to the memory area 55_1, the key data used for deciding the access right to the memory area 55_2, and the key data used for deciding the access right to the memory area 55_3. The key data is used for the mutual authentication, the encryption and decryption, etc. of the data.

Further, the memory 50 stores identification data of the IC card 3 or the user of the IC card 3.

The mobile communication device 41 has a communication processing unit 43 for communication with ASP server apparatuses 19a and 19b via a mobile phone network and the Internet 10 and an IC module 42 able to transfer data with the communication processing unit 43 and communicates with the SAM unit 9a from an antenna via the Internet.

The IC module 42 has the same functions as those of the IC module 3a of the IC card explained above except for the point of transferring data with the communication processing unit 43 of the mobile communication device 41.

Note that the processing using the mobile communication device 41 is carried out in the same way as the processing using the IC card 3, while the processing using the IC module 42 is carried out in the same way as the processing using the IC module 3a. Therefore, in the following explanation, the processing using the IC card 3 and the IC module 3a will be exemplified.

Below, an explanation will be given of the SAM units 9a and 9b.

As shown in FIG. 5, the SAM units 9a and 9b have external memories 7 and SAM modules 8.

Here, the SAM module 8 may be realized as a semiconductor circuit or may be realized as a device accommodating a plurality of circuits in a housing.

[Software Configuration of SAM Module 8]

Figure 11:
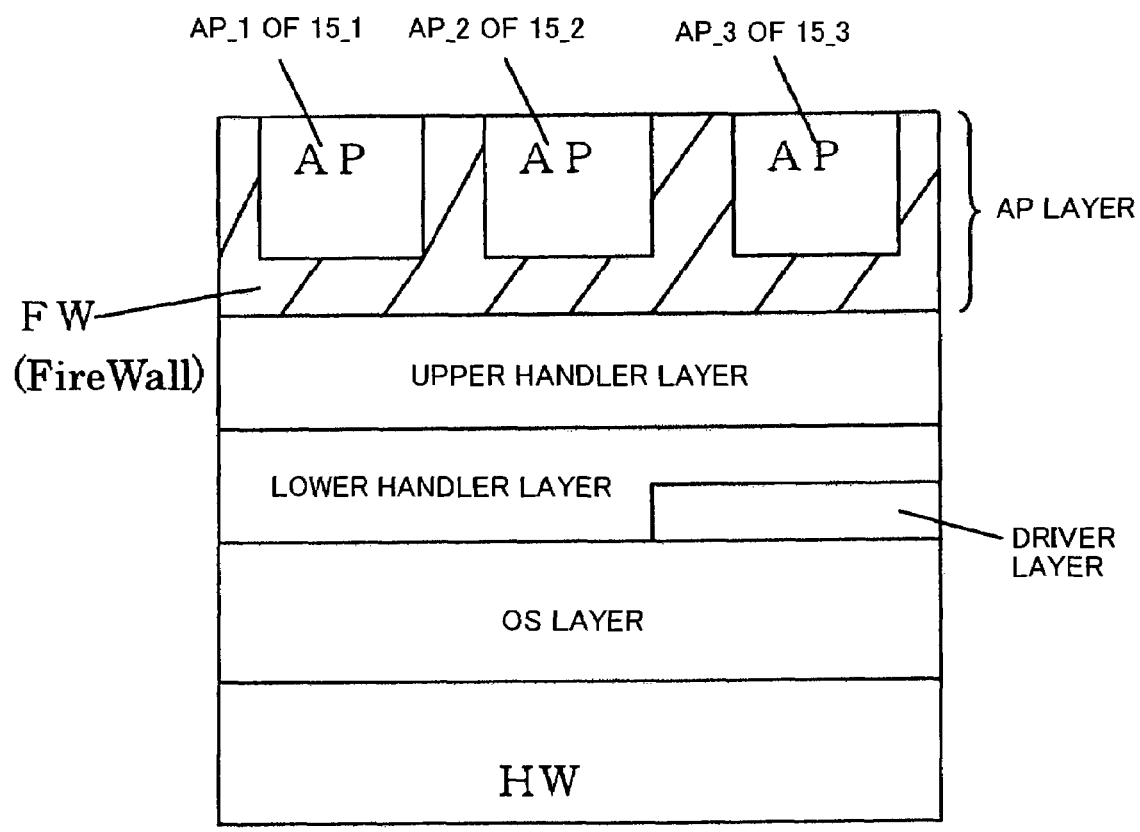
FIG. 11 is a view for explaining the software configuration of a SAM module shown in FIG. 5.

The SAM module 8 has the software configuration as shown in FIG. 11.

As shown in FIG. 11, the SAM module 8 has, from the bottom layer to the top layer, a hardware HW layer, a driver layer (OS layer) including an RTOS kernel etc. corresponding to the peripheral HW, a lower handler layer for performing processing in logically composed units, an upper handler layer combining application-specific libraries, and an AP layer in that order.

Here, in the AP layer, the application programs AP_1, AP_2, and AP_3 prescribing procedures by the service businesses 16_1, 16_2, and 16_3 such as the credit card company shown in FIG. 5 using the IC cards 3 are read out from the external memory 7 and run.

In the AP layer, firewalls FW are provided between the application programs AP_1, AP_2, and AP_3 and between them and the upper handler layer.

[Hardware Configuration of SAM Module 8]

Figure 12:
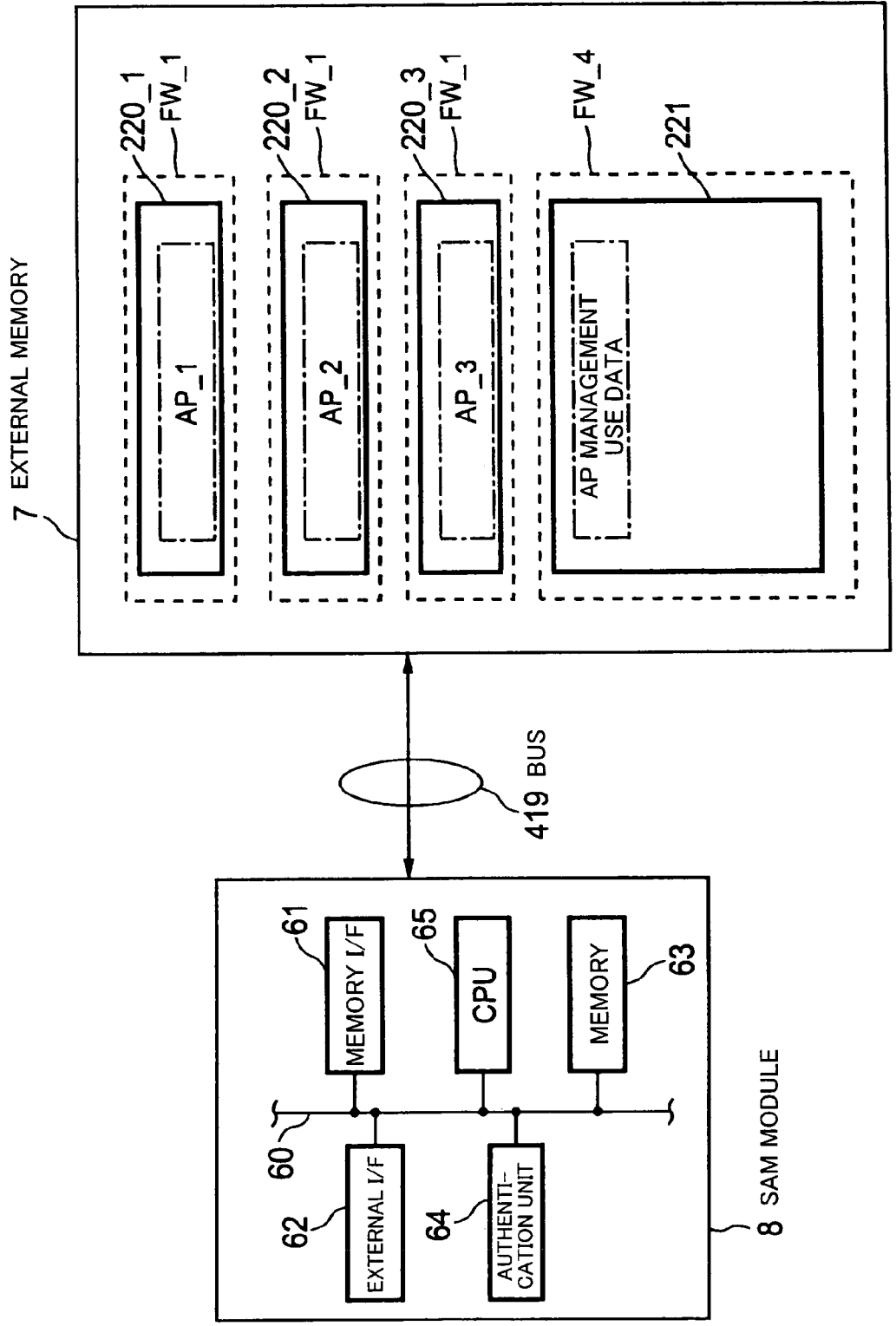
FIG. 12 is a view for explaining the hardware configuration of the SAM module shown in FIG. 5 and a memory area of an external memory 7.

FIG. 12 is a view for explaining the hardware configuration of the SAM module 8 and the memory area of the external memory 7.

As shown in FIG. 12, the SAM module 8 has for example a memory I/F 61, an external I/F 62, a memory 63, an authentication unit 64, and a CPU 65 connected via a bus 60.

Further, the SAM module 8 corresponds to the data processing device of the fifth aspect of the invention. It is also possible to execute a program including the following steps to realize its functions thereof.

The memory I/F 61 transfers data with the external memory 7.

The external I/F 62 transfers data and commands with the ASP server apparatuses 19a and 19b and the management device 20 shown in FIG. 5.

The memory 63 stores various key data etc. used for the mutual authentication etc. of the SAM units 9a and 9b explained later. The key data may be stored in the AP management use memory area 221 of the external memory 7 as well.

The authentication unit 64 performs the processing relating to the mutual authentication explained later. The authentication unit 64 performs for example encryption and decryption using predetermined key data.

The CPU 65 centrally controls the processing of the SAM module 8.

When confirming that the means to be authenticated is a legitimate party by the mutual authentication, the CPU 65 authorizes the processing related to the mutual authentication key data explained later to the means to be authenticated and executes this as will be explained later.

A detailed explanation will be given below of the mutual authentication processing by the SAM module 8.

[External Memory 7]

As shown in FIG. 12, the memory area of the external memory 7 includes an AP memory area 220_1 (service AP resource area) for storing the application program AP_1 of the service business 15_1, an AP memory area 220_2 for storing the application program AP_2 of the service business 15_2, an AP memory area 220_3 for storing the application program AP_2 of the service business 15_3, and an AP management use memory area 221 (system AP resource area and manufacturer AP resource area) used by the manager of the SAM module 208.

Figure 13:
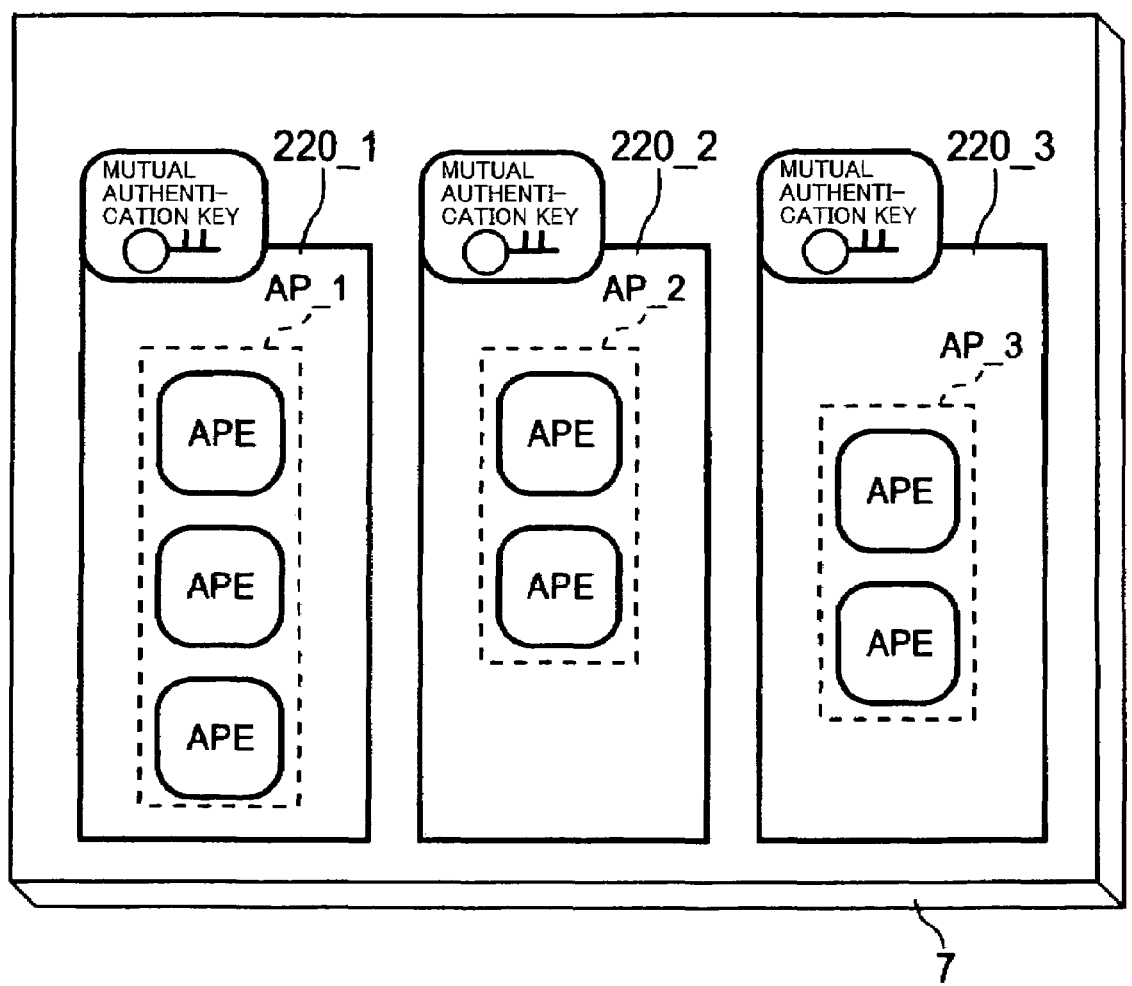
FIG. 13 is a view for explaining an AP memory area shown in FIG. 12.

The application program AP_1 stored in the AP memory area 220_1 includes a plurality of application element data APE explained later as shown in FIG. 13. The access to the AP memory area 220_1 is restricted by a firewall FW_1 (shown in FIG. 12).

The application program AP_2 stored in the AP memory area 220_2 includes a plurality of application element data APE as shown in FIG. 13. The access to the AP memory area 220_2 is restricted by a firewall FW_2 (shown in FIG. 12).

The application program AP_3 stored in the AP memory area 220_3 includes a plurality of application element data APE as shown in FIG. 13. The access to the AP memory area 220_3 is restricted by a firewall FW_3 (illustrated in FIG. 12).

In the present embodiment, the application element data APE is the minimum unit downloaded from the outside of for example the SAM unit 9*a* into the external memory 7. The number of the application element data APE composing each application program can be freely determined by the corresponding service business.

Further, the application programs AP_1, AP_2, and AP_3 are prepared for example by service businesses 16_1, 16_2, and 16_3 by using the personal computers 15_1, 15_2, and 15_3 shown in FIG. 5 and downloaded to the external memory 7 via the SAM mobile 8.

Note that the program and the data stored in the AP management use memory area 221 are also composed by using the application element data APE.

Figure 14:
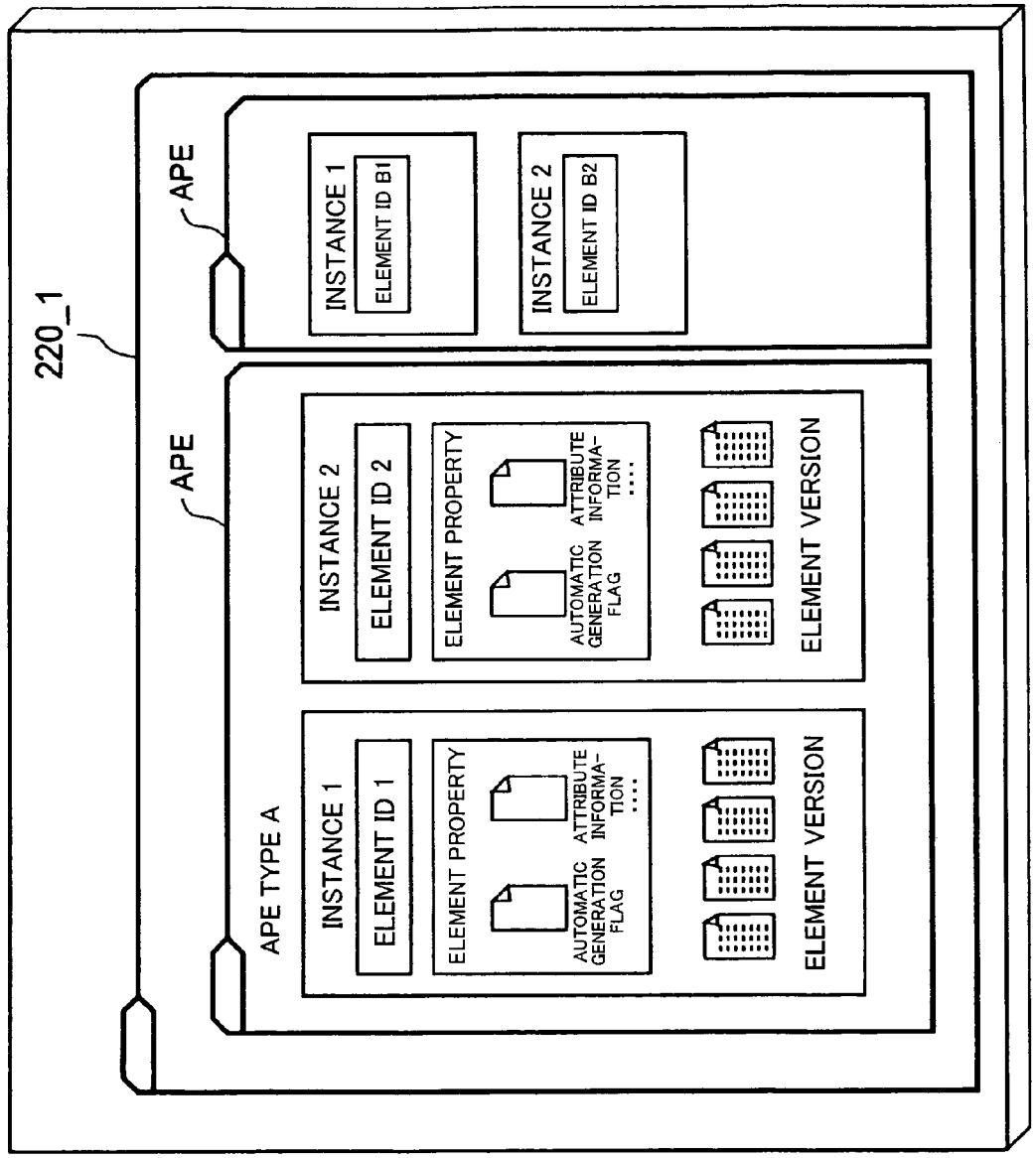
FIG. 14 is a view for explaining application element data.

FIG. 14 is a view for explaining the application element data APE.

The application element data APE is composed by using the instance prescribed according to the APE type indicating the classification prescribed based on the attribute (type) of the APE as shown in FIG. 14.

Each instance is prescribed according to an element ID, an element property, and an element version.

It is prescribed based on the APE type in which of the service AP memory areas 220_1, 220_2, and 220_3 and the AP management use memory area 221 shown in FIG. 12 the application element data APE is stored.

The service AP memory area 220_1 stores the data which can be accessed by each service business.

Note that the AP management use memory area 221 has a system AP memory area (not illustrated) for storing the data which can be accessed by the manager of the system and a manufacturer AP memory area (not illustrated) for storing the data which can be accessed by the manufacturer of the system.

Further, the AP memory area is composed by the service AP memory areas 220_1, 220_2, and 220_3 and the AP management use memory area 221.

In the present embodiment, an ID (AP memory area ID) is assigned to each of the service AP memory areas 220_1, 220_2, and 220_3 and the AP management use memory area 221, and an identification use number (APE type number, instance number, and element version number) is assigned to each of the APE type, the instance, and the element version.

FIG. 15 is a view for explaining an example of the APE type.

As shown in FIG. 15, the APE type includes IC system key data, IC area key data, IC service key data, IC synthetic key data, IC key change package, IC issuance key package, IC EXPANSION issuance key package, IC area registration key package, IC area deletion key package, IC service registration key package, IC service deletion key package, IC memory division key package, IC memory division element key package, obstacle recording file, mutual authentication use key, package key, negative list, and service data temporary file.

The APE type number is assigned to each APE type.

Below, an explanation will be given of part of the APE type shown in FIG. 15.

The IC system key data, the IC area key data, the IC service key data, and the IC synthetic key data are card access key data used for the read/write operation of data with respect to the memories 50 of the IC card 3 and the IC module 42.

The mutual authentication use key data is also used for the mutual authentication between APs existing in the same SAM. The SAM mutual authentication use key data means the key data used when accessing the corresponding application element data APE from another AP in the same SAM or another SAM.

The IC memory division use key package is the data used for dividing the memory area of the external memory 7 and the memory of the IC card 3 before the start of provision of service using the IC card 3 by the service business.

The IC area registration key package is the data used at the time of area registration in the memory area of the memory of the IC card 3 before starting provision of service using the IC card 3 by the service business.

The IC area deletion key package is a package able to be automatically generated from the card access key data inside the SAM.

The IC service registration use key package is used for registering the application element data APE of the external memory 7 before the start of the provision of the service using the IC card 3 by the service business.

The IC server deletion key package is used for deleting application element data APE registered in the external memory 7.

[Preparation of Owner Card 72 and User Card 73]

Figure 16:
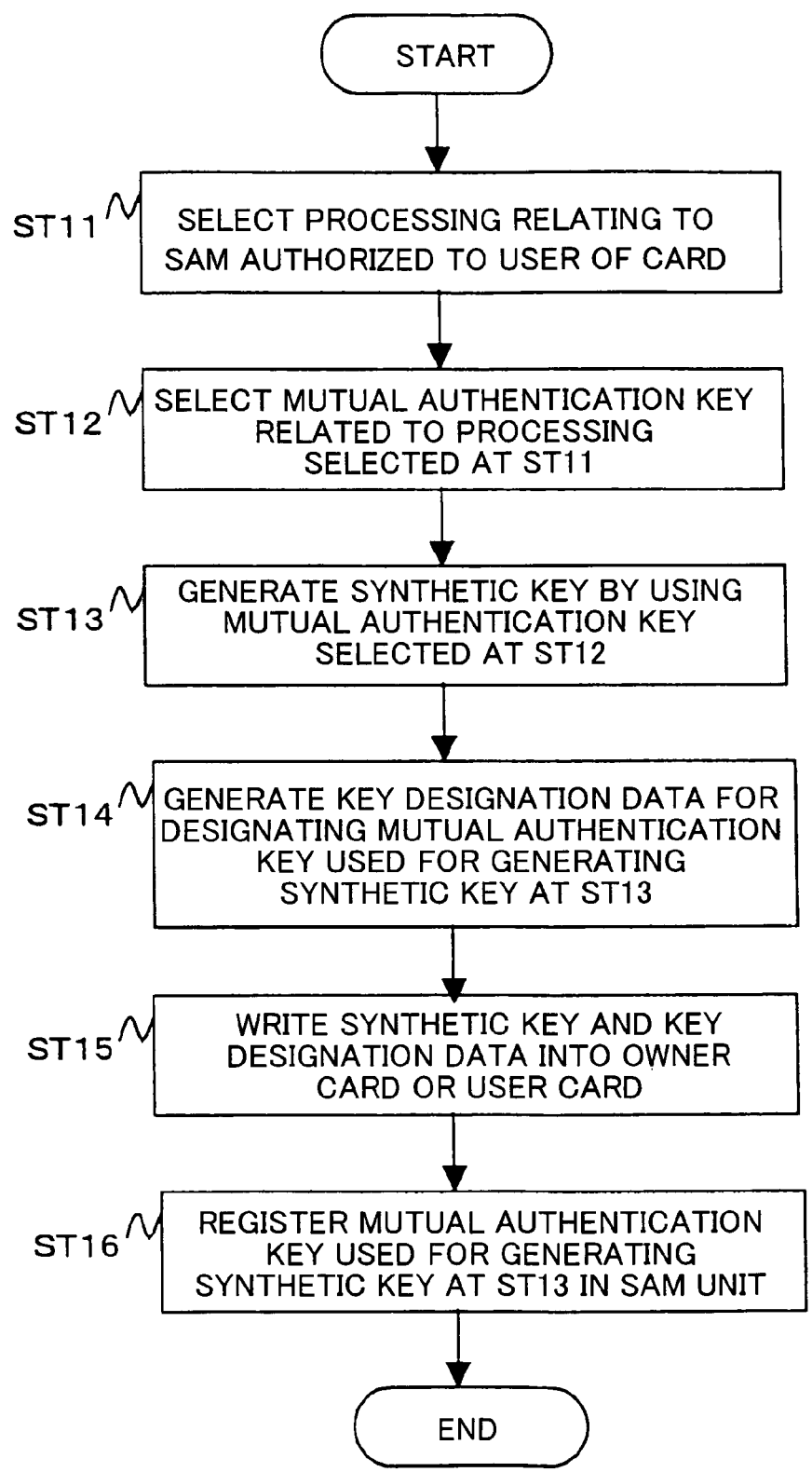
FIG. 16 is a flow chart for explaining preparation steps of an owner card and a user card.

FIG. 16 is a flow chart for explaining steps for preparation of the owner card 72 and the user card 73.

FIG. 16 shows details of steps ST1 shown in FIG. 7.

Step ST11:

For example, when the manager prepares the owner card 72, it selects the processing relating to the SAM units 9*a* and 9*b* authorized to the user of the owner card 72.

Further, when the manager etc. prepares the user card 73, it selects the processing relating to the SAM units 9*a* and 9*b* authorized to the user of the user card 73.

The processing relating to the SAM units 9*a* and 9*b* includes for example the processing for executing the functions provided by the SAM units 9*a* and 9*b* or the access to the data held by the SAM units 9*a* and 9*b* (for example the application element data APE).

Step ST12:

The manager etc. selects the mutual authentication key data related to the processing selected at step ST11 and inputs or designates the same to the card management function portion 58 of the management device 20.

The mutual authentication key data will be explained in detail later.

Step ST13:

The card management function portion 58 of the management device 20 uses one or more mutual authentication key data selected at step ST12 to generate the synthetic key data based on the degradation processing method explained later.

The degradation processing will be explained in detail later.

Step ST14:

The card management function portion 58 of the management device 20 generates the key designation data indicating the mutual authentication code for identifying the mutual authentication key data used for generating the synthetic key data at step ST13.

The key designation data becomes data indicating the right of execution of the processing relating to the SAM units 9a and 9b acquired by the user of the owner card 72 or the user card 73.

Step ST15:

The card management function portion 58 of the management device 20 writes the synthetic key data generated at step ST13 and the key designation data generated at step ST14 into the IC of the owner card 72 or the user card 73.

Step ST16:

The card management function portion 58 of the management device 20 registers the mutual authentication key data used for generating the synthetic key data of step ST13 into the SAM units 9a and 9b.

Below, an explanation will be given of the mutual authentication key data covered by the selection at step ST12 shown in FIG. 16 explained above.

FIG. 17 is a view for explaining the mutual authentication key data covered by the selection at step ST12 shown in FIG. 16.

As shown in FIG. 17, the mutual authentication key data includes for example device key data, termination key data, manufacturer setting service mutual authentication key data, hardware management service mutual authentication key data, communication management service mutual authentication key data, mutual authentication service mutual authentication key data, AP memory area management service mutual authentication key data, service AP memory area mutual authentication key data, system AP memory area mutual authentication key data, and manufacturer AP memory area mutual authentication key data.

Further, as shown in FIG. 17 and FIG. 18, the mutual authentication code of the mutual authentication key data includes an AP memory area ID, an element type number, an element instance number, and an element version number explained by using FIG. 14.

Below, an explanation will be given of the key designation data generated at step ST14 shown in FIG. 16 explained above.

The key designation data is a mutual authentication code list composed by using the mutual authentication codes of a plurality of mutual authentication key data.

FIG. 19A and FIG. 19B are views for explaining an example of the key designation data.

At step ST12 of FIG. 16, when for example the device key data, the hardware management service mutual authentication key data, the communication management service mutual authentication key data, the AP memory area management service mutual authentication key data, the service AP memory area mutual authentication key data, and the termination key data shown in FIG. 17 are selected, as shown in FIG. 19A, key designation data indicating the mutual authentication codes of all selected mutual authentication key data is generated.

At step ST13 shown in FIG. 16, when the synthetic key data is generated by using the mutual authentication key data of the mutual authentication codes shown in FIG. 19A, the mutual authentication with the SAM units 9a and 9b using the synthetic key data authorizes the management device 20, as shown in FIG. 19B, to access the hardware management service, the communication management service, the IC service (service concerning the IC card 3 and the IC module 421), the mutual authentication service, and the AP memory area management service.

In this way, in the present embodiment, the synthetic key data can be generated by using the functions of the SAM units 9a and 9b and the mutual authentication key data related to a plurality of processing including the access to the data held by the SAM units 9a and 9b (for example the application element data APE).

Due to this, the mutual authentication using a single synthetic key data enables the SAM units 9a and 9b to collectively judge whether or not both of the functions of the SAM units 9a and 9b and the access to the data held by the SAM units 9a and 9b are authorized to the means to be authenticated.

Then, the SAM units 9a and 9b execute the processings relating to the predetermined functions related to the mutual authentication key data and authorize access to the data held by the SAM units 9a and 9b from the means to be authenticated in response to an instruction of the means to be authenticated when authenticating that the means to be authenticated is legitimate.

Below, an explanation will be given of the degradation processing method of step ST13 shown in FIG. 16.

Figure 20:
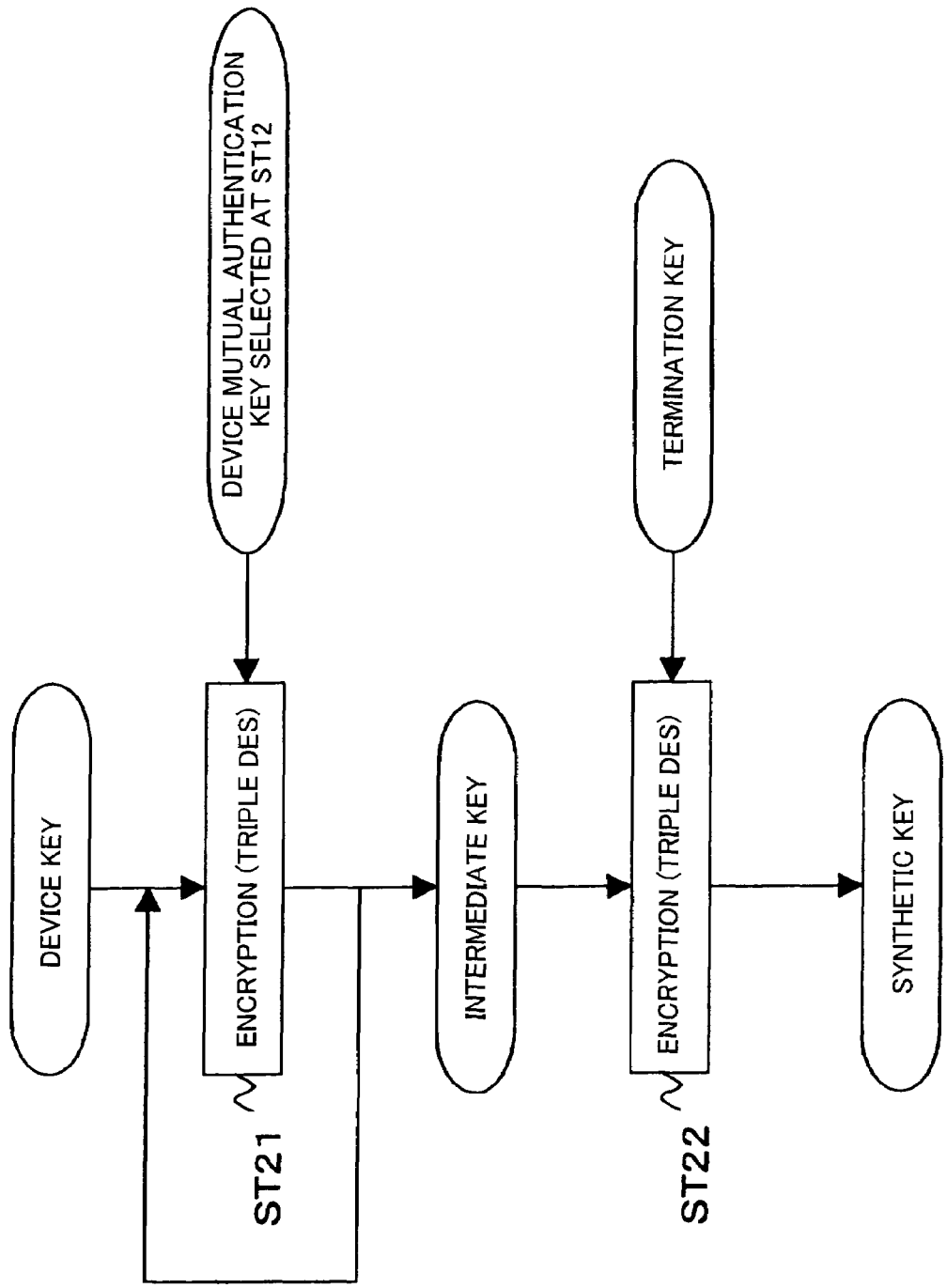
FIG. 20 is a view for explaining a method for generating synthetic key data.

FIG. 20 is a flow chart for explaining the degradation processing method.

Step ST21:

The card management function portion 58 of the management device 20 uses the device key data as a message, uses the first of the mutual authentication key data other than the device key data and termination key data selected at step ST12 shown in FIG. 16 as the encryption key, and encrypts the device key data to generate intermediate key data.

Here, when the number of the mutual authentication key data other than the device key data and the termination key data selected at step ST12 is one, the card management function portion 58 performs the processing of the following step ST22 by using the intermediate key data.

On the other hand, when the number of the mutual authentication key data other than the device key data and the termination key data selected at step ST12 is two or more, the card management function portion 58 uses the intermediate key data as the message and uses the next mutual authentication key data as the encryption key to perform the encryption.

The card management function portion 58 uses all mutual authentication key data other than the device key data and the termination key data selected at step ST12 as the encryption key and repeats the above processings until the above encryption is carried out. When it ends, it proceeds to the processing of step ST22.

Step ST22:

The card management function portion 58 uses the intermediate key data obtained at step ST21 as the message and uses the termination key data as the encryption key to perform the encryption to generate the synthetic key data.

The termination key data is tamper-proofing key data and is held only by the manager.

Due to this, it is possible to prevent a party other than the manager from illegitimately tampering with the synthetic key data.

Below, an explanation will be given of a case of generating synthetic key data by a predetermined degradation processing method using the owner termination key data owned by only the manager (owner) and the user termination key data owned by the user given a right from the manager as the termination key data.

Figure 21:
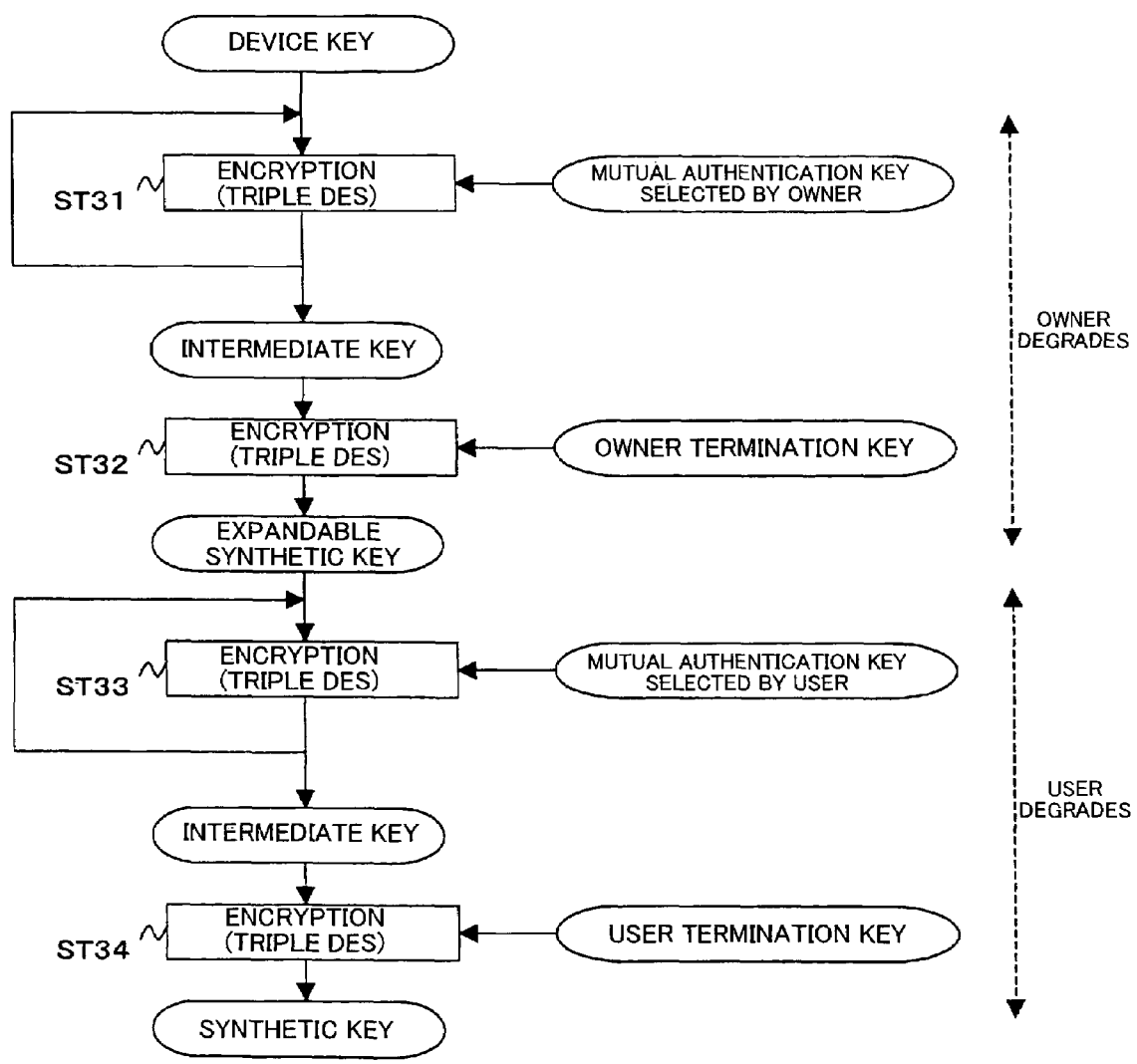
FIG. 21 is a view for explaining another method of generation of synthetic key data.

FIG. 21 is a flow chart for explaining the degradation processing method.

In FIG. 21, the processings of steps ST31 and ST32 are the same as the processings of steps ST21 and ST22 explained by using FIG. 20 except for the point of using the owner termination key data as the termination key data.

The synthetic key data generated at step ST32 is the synthetic key data which can be expanded in the sense that the users given the user termination key data can be increased.

Step ST33:

The card management function portion 58 of the management device 20 uses the expandable synthetic key data generated by the owner as the message and uses the first of the mutual authentication key data other than the user termination key data selected by the user as the encryption key to encrypt the device key data to generate the intermediate key data.

Here, when the number of the mutual authentication key data other than the selected user termination key data is one, the card management function portion 58 performs the processing of the following step ST22 using the intermediate key data.

On the other hand, when the number of the mutual authentication key data other than the selected user termination key data is two or more, the card management function portion 58 performs the encryption by using the intermediate key data as the message and using the next mutual authentication key data as the encryption key.

The card management function unit 58 repeats the above processings until using all mutual authentication key data other than the selected termination key data as the encryption key for the encryption and proceeds to the processing of step ST34 when finishing.

Step ST34:

The card management function unit 58 uses the intermediate key data obtained at step ST33 as the message and uses the user termination key data as the encryption key to perform encryption to generate the synthetic key data.

The user termination key data is the tamper-proofing key data and is held by only the owner and the user.

Due to this, illegitimate tampering with the synthetic key data by a party other than the owner and the user can be prevented.

Figure 22:
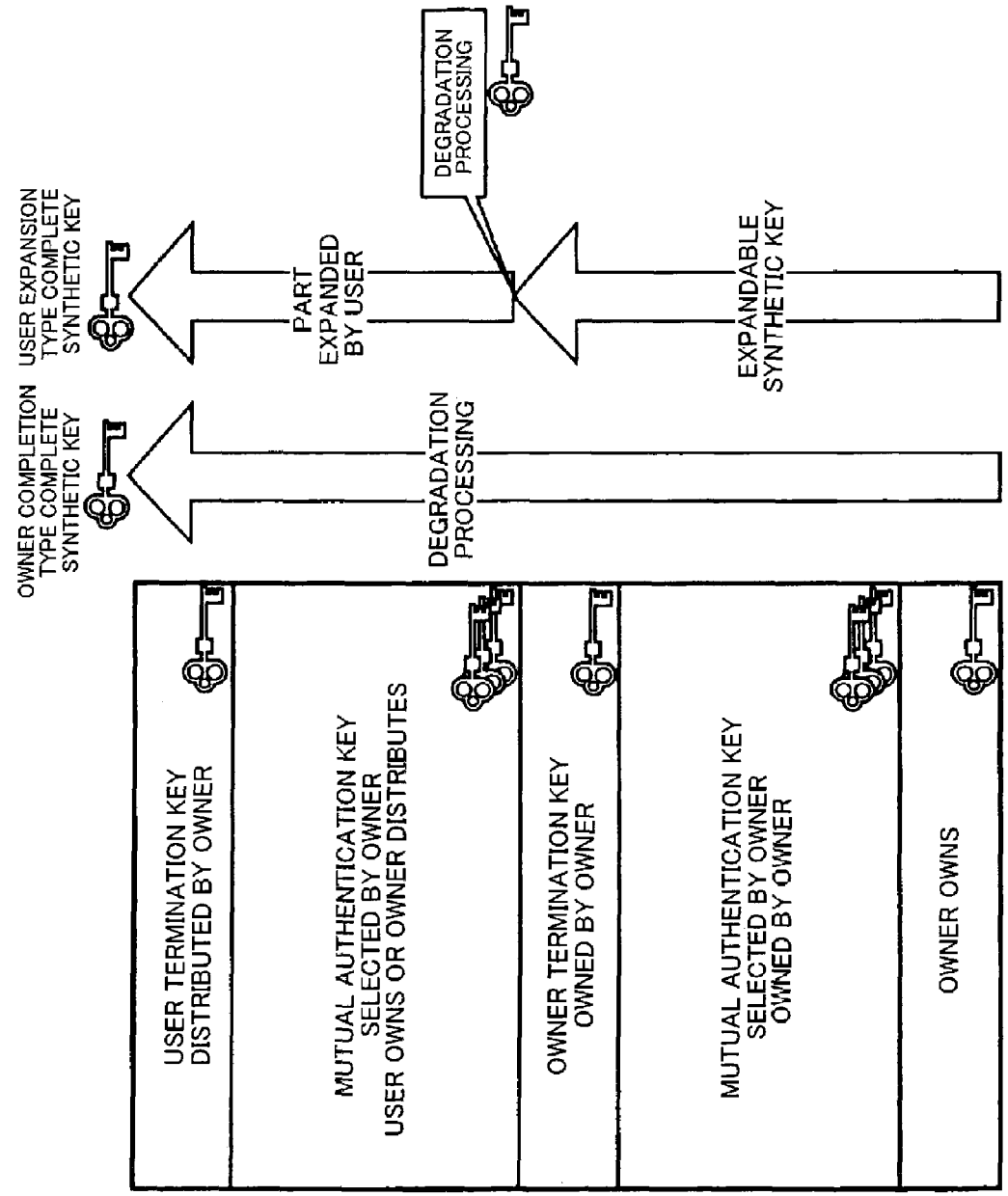
FIG. 22 is a view for explaining the hierarchy of encryption of synthetic key data.

The synthetic key data generated by the processing shown in FIG. 21 includes the mutual authentication key encrypted by the hierarchy as shown in FIG. 22.

Further, in the present embodiment, it is also possible to link a plurality of application element data APE to single mutual authentication key data (for example service, system, and manufacturer AP memory area mutual authentication key data shown in FIG. 17).

Due to this, the authentication using the synthetic key data enables the SAM units 9a and 9b to collectively judge whether or not access to the application element data APE related to the single mutual authentication key data is authorized.

Figure 23:
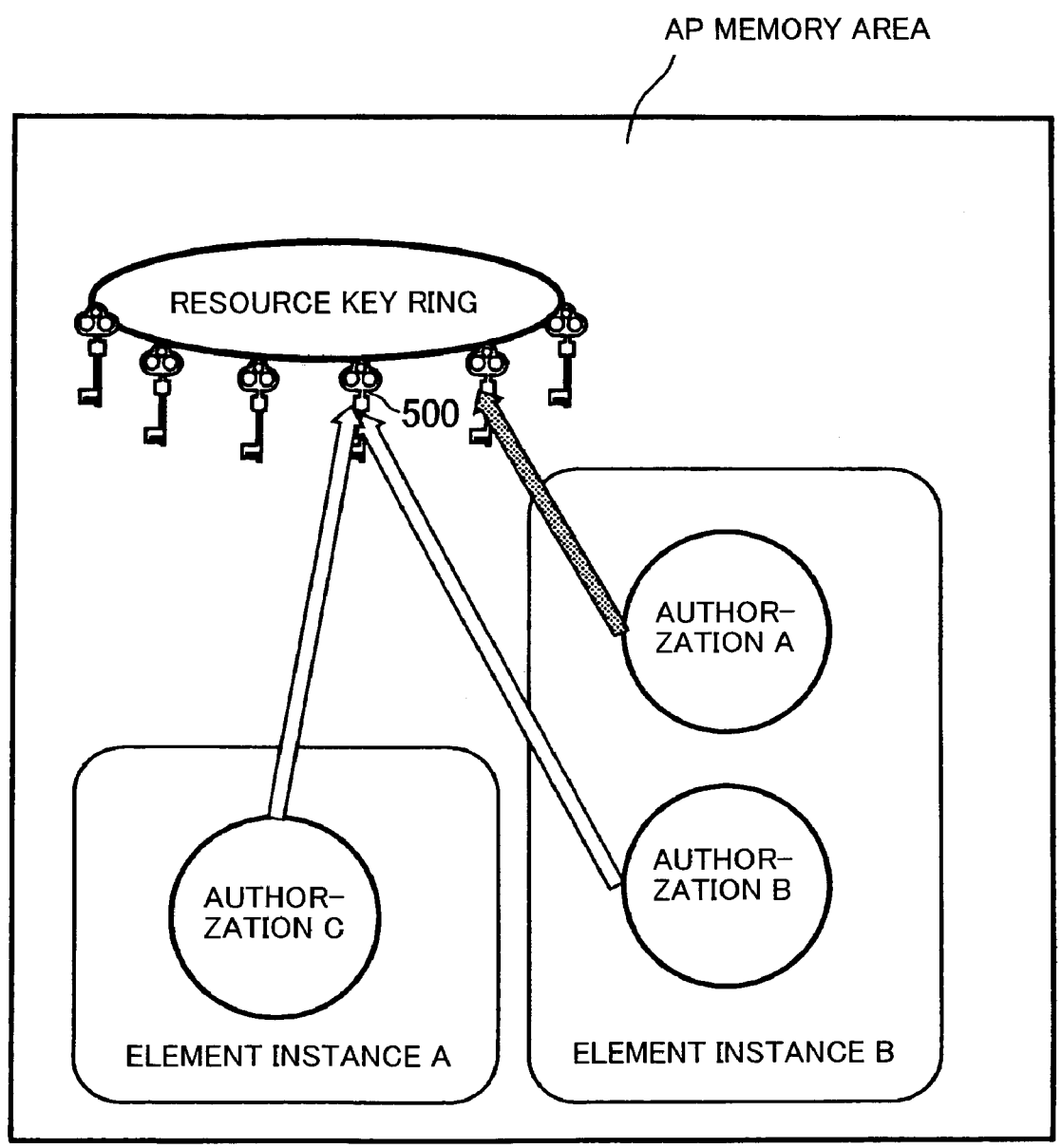
FIG. 23 is a view for explaining an example of the features of synthetic key data.

For example, in FIG. 23, an authorization C of an instance a of the application element data APE and an authorization B of an instance b are linked with mutual authentication key data 500. For this reason, if the authentication using the synthetic key data degrading the mutual authentication key data 500 succeeds, the SAM units 9a and 9b authorize access to both of the instances a and b.

Figure 24:
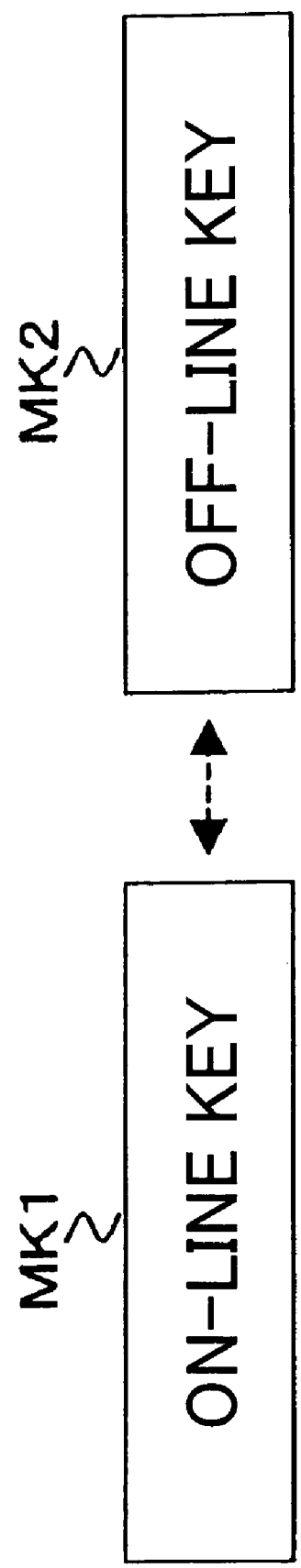
FIG. 24 is a view for explaining an example of a mode of use of the mutual authentication key data.

In the present embodiment, on-line mutual authentication key data MK1 and off-line mutual authentication key data MK2 as shown in FIG. 24 is used in pairs for all or part of the mutual authentication key data explained by using FIG. 17.

In this case, at the time of the mutual authentication, use is made of the on-line key data MK1, while when transferring data with the other party in the mutual authentication, the data to be transferred is encrypted by using the off-line key data MK2 corresponding to that.

Due to this, even if the on-line key data MK1 is illegitimately acquired by another party, since the data transferred between the means to be authenticated and the authenticating means is encrypted by the off-line key data MK2, illegitimate leakage of the information to the outside can be prevented.

Namely, the first authentication key data 321 in the first embodiment corresponds to the on-line key data MK1, and the encryption-key data 322 in the first embodiment corresponds to the off-line key data MK2. Further, the second authentication key data in the first embodiment corresponds to the on-line key data MK1, and the decryption key data 342 in the first embodiment corresponds to the off-line key data MK2.

Below, an explanation will be given of the mutual authentication between the SAM management function portion 57 of the management device 20 and the SAM units 9a and 9b performed at step ST3 etc. shown in FIG. 7.

In this case, the management device 20 becomes the means to be authenticated, and the SAM units 9a and 9b become the authenticating means.

Figure 25:
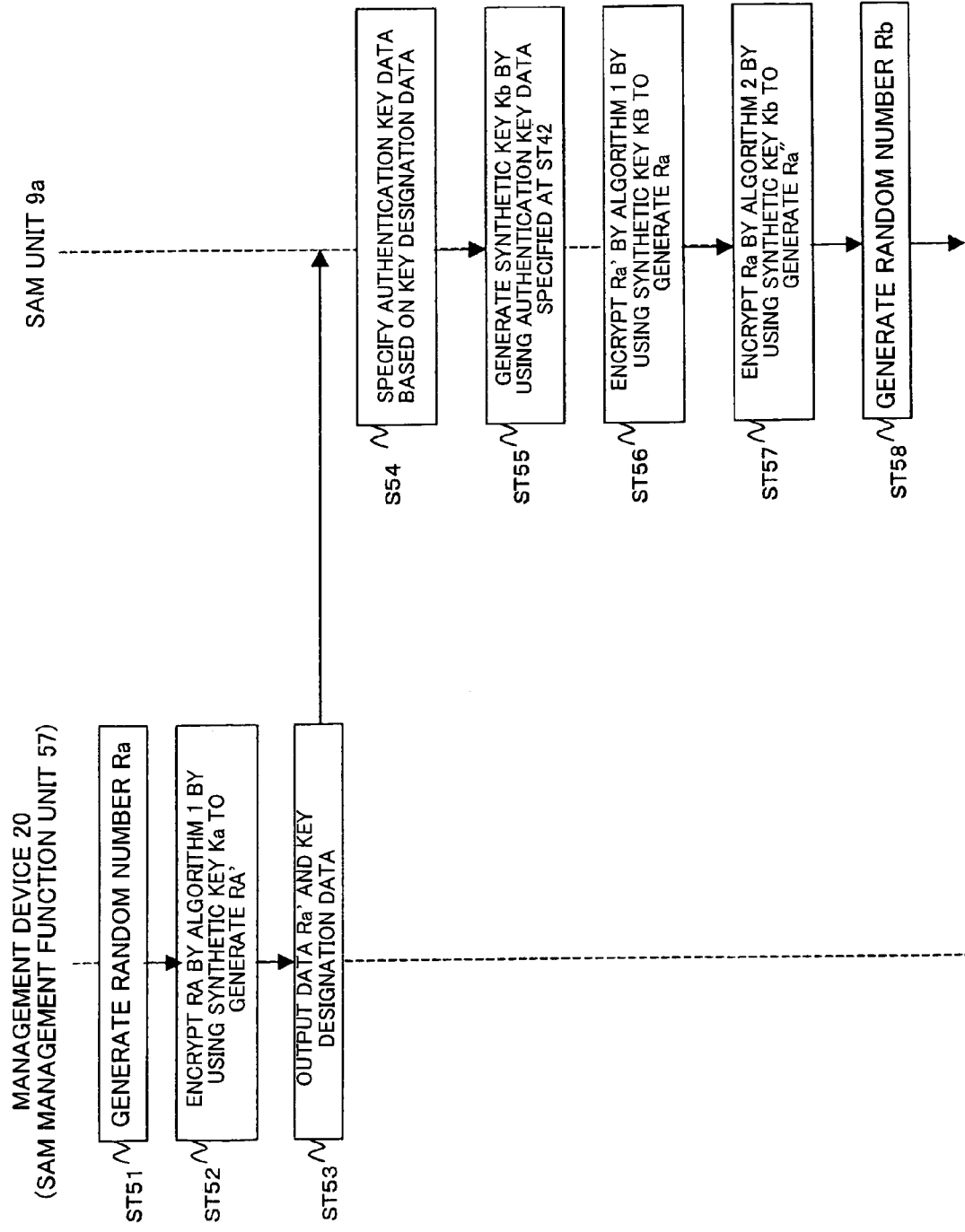
FIG. 25 is a flow chart for explaining mutual authentication between a SAM management function portion of the management device shown in FIG. 5 and the SAM unit.
Figure 26:
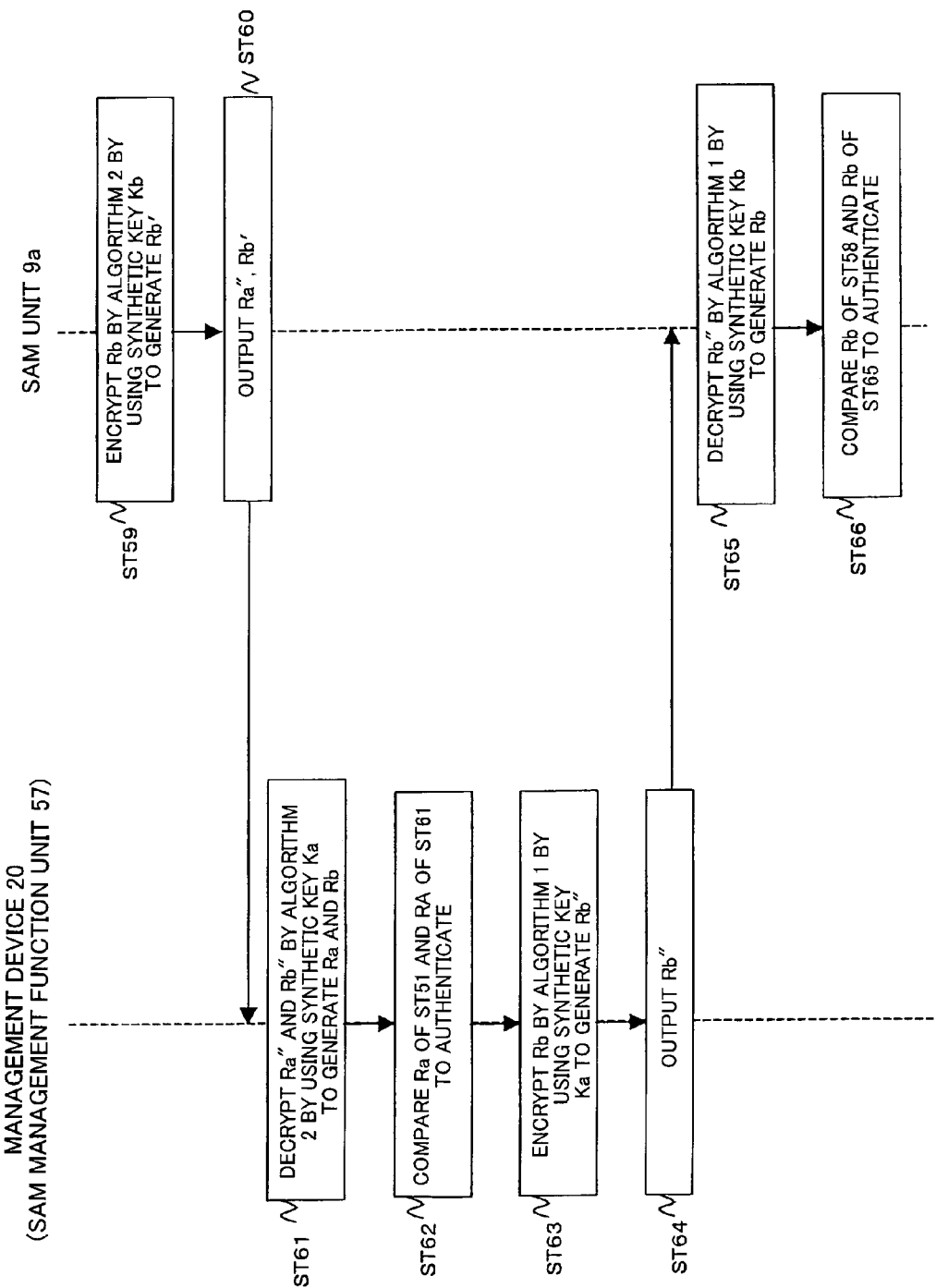
FIG. 26 is a flow chart for explaining mutual authentication between a SAM management function portion of the management device shown in FIG. 5 and the SAM unit continuing from FIG. 25.

FIG. 25 and FIG. 26 are flow charts for explaining the mutual authentication between the SAM management function unit 57 of the management device 20 and the SAM unit 9a.

The SAM unit 9b is the same as the case of the SAM unit 9a shown below.

Step ST51:

First, the manager or user sets the owner card 72 or the user card 73 in the card reader/writer 53.

Then, the synthetic key data Ka (the first authentication use data of the present invention) and the key designation data stored in the owner card 72 and the user card 73 are read into the SAM management function unit 57 of the management device 20.

The SAM management function unit 57 generates a random number Ra.

Step ST52:

The SAM management function unit 57 encrypts the random number Ra generated at step ST51 by an encryption algorithm 1 by using the synthetic key data Ka read at step ST51 to generate the data Ra'.

Step ST53:

The SAM management function unit 57 outputs the key designation data read at step ST51 and the data Ra' generated at step ST52 to the SAM unit 9a.

The SAM unit 9a receives as input the key designation data and the data Ra' via the external I/F 62 shown in FIG. 12 and stores this in the memory 63.

Step ST54:

The authentication unit 64 of the SAM unit 9a specifies the mutual authentication key data indicated by the key designation data input at step ST53 from among the mutual authentication key data stored in the memory 63 or the external memory 7.

Step ST55:

The authentication unit 64 of the SAM unit 9a uses the mutual authentication key data specified at step ST54 to perform the degradation processing explained using FIG. 20 or FIG. 21 to generate the synthetic key data Kb.

Step ST56:

The authentication unit 64 of the SAM unit 9a uses the synthetic key data Kb generated at step ST55 to decrypt the data Ra' input at step ST53 with a decryption algorithm 1 corresponding to the encryption algorithm 1 to generate the random number Ra.

Step ST57:

The authentication unit 64 of the SAM unit 9a uses the synthetic key data Kb to encrypt the random number Ra generated at step ST56 with an encryption algorithm 2 to generate data Ra".

Step ST58:

The authentication unit 64 of the SAM unit 9a generates a random number Rb.

Step ST59:

The authentication unit 64 of the SAM unit 9a uses the synthetic key data Kb to generate data Rb'.

Step ST60:

The authentication unit 64 of the SAM unit 9a outputs the data Ra" generated at step ST57 and the data Rb' generated at step ST59 to the management device 20.

Step ST61:

The SAM management function unit 57 of the management device 20 uses the synthetic key data Ka to decrypt the data Ra" and Rb' input at step ST60 by the decryption algorithm 2 corresponding to the encryption algorithm 2 to generate data Ra and Rb.

Step ST62:

The SAM management function unit 57 of the management device 20 compares the random number Ra generated at step ST51 and the data Ra generated at step ST-61.

Then, when the result is the same as the above comparison, the SAM management function unit 57 authenticates that the synthetic key data Kb held by the SAM unit 9a is the same as the synthetic key data Ka held by the SAM management function unit 57 and the SAM unit 9a is a legitimate authenticating means.

Step ST63:

The SAM management function unit 57 of the management device 20 uses the synthetic key data Ka to encrypt the data Rb generated at step ST61 by the encryption algorithm 1 to generate the data Rb".

Step ST64:

The SAM management function unit 57 of the management device 20 outputs the data Rb" generated at step ST 63 to the SAM unit 9a.

Step ST65:

The authentication unit 64 of the SAM unit 9a uses the synthetic key data Kb to decrypt the data Rb" input at step ST64 by the decryption algorithm 1 to generate the data Rb.

Step ST66:

The authentication unit 64 of the SAM unit 9a compares the random number Rb generated at step ST58 and the data Rb generated at step ST65.

Then, when the same result as that in the above comparison is shown, the authentication unit 64 authenticates that the synthetic key data Kb held by the SAM unit 9a is the same as the synthetic key data Ka held by the SAM management function unit 57 and the SAM management function unit 57 is a legitimate means to be authenticated.

The mutual authentication method explained using the above mentioned FIG. 25 and FIG. 26 may be used in the mutual authentication of, for example, the step ST91 shown in FIG. 4.

In this case, the data processing device 301 performs processing corresponding to the above mentioned management device 20, and the data processing device performs processing corresponding to the above mentioned SAM units 9a and 9b.

Below, an explanation will be given of the processings performed by the SAM units 9a and 9b based on the results of the mutual authentication explained by using FIG. 25 and FIG. 26.

FIG. 27 is a view for explaining the processings of the SAM units 9a and 9b.

Step ST71:

The CPUs 65 of the SAM units 9a and 9b shown in FIG. 12 judge whether or not the authentication unit 64 authenticated that the authenticating means was legitimate at step ST66 shown in FIG. 26. When deciding it as legitimate, they proceed to the processing of step ST72, while when deciding it is not, end the processing (that is, judge that the authenticating means does not have any right relating to the processing and do not execute the processing).

Step ST72:

The CPUs 65 of the SAM units 9a and 9b decrypts an encrypted data (encryption data) inputted from the management device 20 by second decryption algorithm corresponding to the second encrypted algorithm by using decryption key data.

Then, the SAM units 9a and 9b judge whether the decrypted data is decrypted adequately or not, when judging it is decrypted adequately, use the decryption data as it is effective and execute processing related to the mutual authentication key data permitted to the owner card 72 and so on.

On the contrary, when the SAM units 9a and 9b judge that the decrypted data is not decrypted adequately, the decrypted data is decimated (defeated).

As explained above, according to the communication system 1, since mutual authentication between the management device 20 and the SAM units 9a and 9b and generation of encrypted data outputted from the management device 20 to the SAM unit 9a are performed by using different key data, even when synthetic key data used for the mutual authentication is obtained by a third party illegitimately, since the encrypted data is encrypted by using encrypted key data, the third party cannot decipher the encrypted data.

Further, according to the communication system 1, by using different encryption/decryption algorithm for the mutual authentication and the generation of the encrypted data, even when the encryption/decryption algorithm used for the mutual authentication is leaked out to the third party, since the encrypted data is encrypted by the other encryption algorithm, the third party cannot decipher it.

Further, the management device 20, as explained by using FIG. 16 and FIG. 20 etc., uses a plurality of mutual authentication key data related to the processings relating to the SAM units 9a and 9b the degradation processing to generate the synthetic key data.

Then, the synthetic key data and the key designation data for specifying the mutual authentication key data used for generating that are written in the owner card 72 and the user card 73.

Further, by performing the mutual authentication shown using FIG. 25 to FIG. 27 between the management device 20 using the owner card 72 etc. and the SAM units 9a and 9b, the SAM unit 9a generates the synthetic key data based on the key designation data received from the management device 20. When the synthetic key data coincides with that held by the management device 20, it can confirm the legitimacy of the management device 20 serving as the means to be authenticated.

Further, together with the confirmation, the processing related to the mutual authentication key data designated by the key designation data can be judged as processing authorized to the management device 20.

Due to this, the SAM units 9a and 9b serving as the authenticating means do not have to hold the mutual authentication key data corresponding to all means to be authenticated (for example the management device 20 etc. using the owner card 72 and the user card 73) as in the conventional case and, in addition, do not have to manage the processing authorized to the means to be authenticated in the management table either, so the processing load is reduced.

The present invention is not limited to the above embodiment.

In the present invention, it is also possible to store bio-information of the user of the card in the IC of any of for example the owner card 72, the user card 73, the transport card 74, and the AP encryption card 75 and have the SAM units 9a and 9b further use the bio-information stored in the card together with the mutual authentication so as to authenticate the legitimacy of the user.

For example, in the above embodiment, the case where the SAM units 9a and 9b performed the mutual authentication with the management device 20 was exemplified, but it is also possible if the SAM units 9a and 9b perform the authentication with means to be authenticated such as the ASP server apparatuses 19a and 19b or another SAM unit. In this case, the means to be authenticated holds the synthetic key data and the key designation data.

Further, in the embodiment, the case where the owner card 72 and the user card 73 held the synthetic key data and the key designation data was exemplified, but it is also possible to make another mobile device etc. hold these data.

INDUSTRIAL CAPABILITY

The present invention can be applied to a data processing method for performing predetermined processing based on authentication results.

LIST OF REFERENCES

1 . . . communication system
2 . . . server apparatus
3 . . . IC card
4 . . . card RW
6 . . . PC
7 . . . external memory
8 . . . SAM module
9a, 9b, . . . SAM units
19a, 19b, . . . ASP server apparatus
20 . . . management device
51 . . . AP edit tool
52 . . . management tool
53 . . . card reader/writer
54 . . . display
55 . . . I/F, 56 . . . operating unit
57 . . . SAM management function portion
58 . . . card management function portion
61 . . . memory I/F
62 . . . external I/F
63 . . . memory
64 . . . authentication unit
65 . . . CPU
71 . . . default card
72 . . . owner card
73 . . . user card
74 . . . transport card
75 . . . AP encryption card
301 . . . data processing system
302, 303 . . . data processing device
310 . . . memory
311 . . . authentication unit
312 . . . encryption unit
313 . . . interface
314 . . . CPU
330 . . . memory
331 . . . authentication unit
332 . . . decryption unit
333 . . . I/F

The invention claimed is:

1. A data processing method performed by a first processing device and a second processing device when the first data processing device holds first authentication key data and encryption key data and the second data processing device holds second authentication key data corresponding to the first authentication key data and decryption key data corresponding to the encryption data, comprising:

a first step by which the first data processing device uses the first authentication key data, wherein the first authentication key data is from an integrated circuit ("IC") device and had been generated using key data designated by key designation data, and the second processing device uses the second authentication key data, wherein the second authentication key data is generated in the second data processing device using the key data designated by the key designation data which has been communicated to the second data processing device and is from the IC device, and authentication is performed between the first data processing device and the second data processing device;

a second step by which, when the second data processing device verifies the first data processing device by the authentication in the first step, the first processing device uses the encryption key data for encryption and the second processing device decrypts encrypted data provided to the second data processing device by using the decryption key data, and a third step by which, when the second data processing device judges that decryption data obtained by the decryption in the second step is decrypted adequately, the second data processing device uses the decryption data as the data that is effective.

2. The data processing method according to claim 1, wherein in the first step, the first data processing device and the second data processing device perform encryption and decryption of predetermined data based on a first encryption algorithm and a first decryption algorithm corresponding to the first encryption algorithm and perform the authentication, and in the second step, the second data processing device decrypts the encrypted data encrypted based on a second encryption algorithm based on a second decryption algorithm corresponding to the second encryption algorithm.

3. The data processing method according to claim 1, wherein the first data processing device is verified in the second step, when the second data processing device judges that the first authentication key data and the second authentication key data are the same by the authentication in the first step.

4. The data processing method according to claim 1, wherein, when the first authentication key data is generated by a first predetermined generation method by using the key data, the first step comprises:

a fourth step by which the first data processing device provides the key designation data from the IC device to the second data processing device, a fifth step by which the second data processing device generates the second authentication key data by a second predetermined generation method by using the key data designated by the key designation data received in the fourth step, a sixth step by which the first data processing device uses the first authentication key data and uses the second authentication key data generated by the second data processing device in the fifth step to perform the authentication, and a seventh step by which, when the second data processing device judges that the first authentication key data and the second authentication key data are the same, the first data processing device is verified.

5. The data processing method according to claim 1, wherein the first authentication key data is communicatively provided from the IC device to the first data processing device.

6. A data processing system comprising:

a first data processing device holding first authentication key data and encryption key data, wherein the first authentication key data is from an integrated circuit ("IC") device and had been generated using key data designated by key designation data, and a second data processing device holding second authentication key data corresponding to the first authentication key data, and decryption key data corresponding to the encryption key data, wherein the second authentication key data is generated in the second data processing device using the key data designated by the key designation data which has been communicated to the second data processing device and is from the IC device, wherein the first data processing device uses the first authentication key data and the second data processing device uses the second authentication key data, and an authentication is performed between the first data processing device and the second data processing device, the second data processing device decrypts encrypted data provided to the second data processing device by the first data processing device by using the encryption key data for encryption by using the decryption key data, when the second data processing device verifies the first data processing device by the authentication, and the second data processing device uses the decryption data as the data that is effective, when the second data processing device judged decryption data obtained by the decryption is decrypted adequately.

7. A data processing system according to claim 6, wherein the first authentication key data is communicatively provided from the IC device to the first data processing device.

8. A data processing method performed by a data processing device holding first authentication key data and encryption key data, comprising:

a first step of performing authentication with an authenticated side by using the first authentication key data, wherein the first authentication key data is from an integrated circuit ("IC") device and had been generated using key data designated by key designation data, and wherein the authenticated side uses second authentication key data generated by authenticating means in the authenticated side using the key data designated by the key designation data which has been communicated to the authenticated side and is from the IC device, a second step of encrypting predetermined data by using the encryption key data after the authentication in the first step, and a third step of outputting data obtained from the encryption in the second step to the authenticated side.

9. The data processing method according to claim 8, wherein, when the authenticating means of said authenticated side for holding key data uses the key designation data, generates the second authentication key data based on a first predetermined generation method, performs authentication with the data processing device by using the second authentication key data and uses the data outputted in the third step as the data that is effective, conditional on confirming that the first authentication key data and the second authentication key data are the same, the first step comprises:

a fourth step of providing the key designation data from the IC device to the authenticating means, and a fifth step of performing the authentication with the authenticating means by using the first authentication key data.

10. A data processing method according to claim 8, wherein the first authentication key data is communicatively provided from the IC device to the data processing device.

11. A data processing device encrypting predetermined data and outputting the data to an authenticated side, comprising:

storing means for storing first authentication key data and encryption key data, wherein the first authentication key data is from an integrated circuit ("IC") device and had been generated using key data designated by key designation data;

first authenticating means for performing authentication with the authenticated side by using second authentication key data, wherein second authenticating means in the authenticated side generates the second authentication key data using the key data designated by the key designation data which has been communicated to the authenticated side and is from the IC device;

encryption means for encrypting predetermined data by using the encryption key data after the authentication of the first authenticating means, and output means for outputting data obtained by the encryption of the encryption means to the authenticated side.

12. A data processing device according to claim 11, wherein the authentication key data is communicatively provided from the IC device to the data processing device.

13. A program on a computer readable medium and including information executable by a data processing device holding first authentication key data and encryption key data, the program comprising:
- a first step of performing authentication with an authenticated side by using the first authentication key data, wherein the first authentication key data is from an integrated circuit ("IC") device and had been generated using key data designated by key designation data, and wherein the authenticated side uses second authentication key data generated in the authenticated side using the key data designated by the key designation data which has been communicated to the authenticated side and is from the IC device;
- a second step of encrypting predetermined data by using the encryption key data after the authentication in the first step, and
- a third step of outputting data obtained by the encryption in the second step to the authenticated side.

14. A program according to claim 13,
wherein the authentication key data is communicatively provided from the IC device to the data processing device.

15. A data processing method performed by a data processing device holding authentication key data and decryption key data, comprising:
- a first step of performing authentication with means to be authenticated by using second authentication key data, wherein the second authentication key data is generated in authenticating means of the data processing device from key data designated by key designation data which has been communicated to the means to be authenticated and is from an integrated circuit ("IC") device, and wherein the IC device includes first authentication key data generated using the key data designated by the key designation data;
- a second step of decrypting data received from the means to be authenticated by using the decryption key data, and
- a third step of using data obtained by the decryption in the second step as the data that is effective, when verifying the means to be authenticated by the authentication in the first step.

16. The data processing method according to claim 15, wherein when the data processing device holding the key data performs authentication with the means to be authenticated holding the first authentication key data generated by a first predetermined generation method by using the key data,
the first step comprises:
- a fourth step of receiving at the data processing device the key designation data retrieved from the IC device and designating the key data from the means to be authenticated,
- a fifth step of generating the second authentication key data by a second predetermined generation method by using the key data designated by the key designation data received in the fourth step,
- a sixth step of performing the authentication with the means to be authenticated using the first authentication key data for the authentication by using the second authentication key data generated in the fifth step, and
- a seventh step of verifying the means to be authenticated when judging that the first authentication key data and the second authentication key data by the authentication are the same in the sixth step.

17. The data processing method according to claim 15, wherein, a function of the data processing device permitted by the means to be authenticated related to the key data, or an access to data held by the data processing device, is executed in the third step.

18. A data processing method according to claim 15,
wherein the first authentication key data is communicatively provided from the IC device to the means to be authenticated.

19. A data processing device holding authentication key data and decryption key data, comprising:
- authenticating means for authenticating with means to be authenticated by using second authentication key data, wherein the second authentication key data is generated in the authenticating means from key data designated by key designation data which has been communicated to the data processing device and is from an integrated circuit ("IC") device, and wherein the IC device includes first authentication key data generated using the key data designated by the key designation data;
- input means for inputting data from the decryption key data;
- decryption means for decrypting the data inputted from the means to be authenticated via the input means by using the decryption key data, and
- control means for using data obtained by the decryption of the decryption means as the data that is effective when the means to be authenticated is verified by the authentication of the authenticating means.

20. A data processing device according to claim 19,
wherein the first authentication key data is communicatively provided from the IC device to the means to be authenticated.

21. A program on a computer readable medium and including information executable by a data processing device holding authentication key data and decryption key data, the program comprising:
- a first step of performing authentication with means to be authenticated by using second authentication key data, wherein the second authentication key data is generated in the data processing device from key data designated by key designation data which has been communicated to the data processing device and is from an integrated circuit ("IC") device, and wherein the IC device includes first authentication key data generated using the key data designated by the key designation data;
- a second step of decrypting data received from the means to be authenticated by using the decryption key data, and
- a third step of using data obtained by the decryption in the second step as the data that is effective when the means to be authenticated is verified by the authentication in the first step.

22. A program according to claim 21,
wherein the first authentication key data is communicatively provided from the IC device to the means to be authenticated.

23. A method for authentication comprising:
retrieving first authentication key data and key designation data from an integrated circuit ("IC")device of a mobile communication device, wherein the first authentication key data had been generated using key data designated by the key designation data; and
using the first authentication key data at a first data processing device and second authentication key data at a second data processing device to perform authentication between the first data processing device and the second data processing device, wherein the second authentication key data is generated at the second data processing device using the key data designated by the key designation data which has been communicated to the second processing device and is from the IC device.

24. The method of claim 23, wherein the mobile communication device is a cellular telephone.

25. The method of claim 23 further comprising:
verifying the first data processing device, when the second data processing device judges that the first authentication key data and the second authentication key data are the same by the authentication.

26. The method of claim 23, wherein the first authentication key data is generated by a first predetermined generation method using the key data, the method further comprising:
providing the key designation data by the first processing device from the IC device to the second data processing device;
generating at the second data processing device the second authentication key data by a second predetermined generation method by using the key data designated by the key designation data received from the first data processing device; and
verifying the first data processing device, when the second data processing device judges that the first authentication data and the second authentication data are the same.

27. A system for authentication comprising:
a first data processing device holding first authentication key data, wherein the first authentication key data is from an integrated circuit ("IC") device of a mobile communication device and had been generated using key data designated by key designation data, and
a second data processing device holding second authentication key data, wherein the second authentication key data is generated in the second data processing device using the key data designated by the key designation data which has been communicated to the second data processing device and is from the IC device of the mobile communication device,
wherein the first data processing device uses the first authentication key data and the second data processing device uses the second authentication key data to perform an authentication between the first data processing device and the second data processing device.

28. The system of claim 27, wherein the mobile communication device is a cellular telephone.

29. The system of claim 27, wherein the first data processing device is verified, when the second data processing device judges that the first authentication key data and the second authentication data are the same by the authentication.

30. The system of claim 27, wherein the first authentication key data is generated by a first predetermined generation method using the key data, and wherein the first data processing device provides the key designation data from the IC device to the second data processing device;
wherein the second data processing device generates the second authentication key data by a second predetermined generation method by using the key data designated by the key designation data received from the first data processing device; and
wherein the first data processing device is verified, when the second data processing device judges that the first authentication data and the second authentication data are the same.

* * * * *